US009413272B2

(12) United States Patent
Aoyagi et al.

(10) Patent No.: US 9,413,272 B2
(45) Date of Patent: Aug. 9, 2016

(54) POWER GENERATION DEVICE HAVING A DIELECTRIC BODY AND AN ELECTRET

(75) Inventors: Seiji Aoyagi, Suita (JP); Tomokazu Takahashi, Suita (JP); Masato Suzuki, Suita (JP); Yasuhiro Yoshikawa, Kyoto (JP)

(73) Assignees: Rohm Co., Ltd., Kyoto (JP); KANSAI UNIVERSITY, Osaka (JP)

( * ) Notice: Subject to any disclaimer, the term of this patent is extended or adjusted under 35 U.S.C. 154(b) by 556 days.

(21) Appl. No.: 13/599,091

(22) Filed: Aug. 30, 2012

(65) Prior Publication Data
US 2013/0057110 A1 Mar. 7, 2013

(30) Foreign Application Priority Data
Sep. 1, 2011 (JP) ................. 2011-190391

(51) Int. Cl.
*H02N 11/00* (2006.01)
*H02N 1/08* (2006.01)
*H01G 7/02* (2006.01)

(52) U.S. Cl.
CPC ... *H02N 1/08* (2013.01); *H01G 7/02* (2013.01)

(58) Field of Classification Search
CPC .................................. H02N 1/08; H01G 7/02
USPC .................................................. 310/300, 309
IPC ...................................................... H02N 11/00
See application file for complete search history.

(56) References Cited

U.S. PATENT DOCUMENTS

| 5,523,639 | A | 6/1996 | Okamoto et al. | |
|---|---|---|---|---|
| 8,304,958 | B2* | 11/2012 | Aoyagi | H02N 1/08 310/309 |
| 2004/0007877 | A1* | 1/2004 | Boland | H02N 1/08 290/1 R |
| 2004/0016120 | A1* | 1/2004 | Boland | H02N 1/08 29/886 |
| 2008/0048521 | A1 | 2/2008 | Mabuchi et al. | |
| 2009/0051242 | A1* | 2/2009 | Suzuki | H01G 7/023 310/300 |
| 2009/0079295 | A1 | 3/2009 | Naruse et al. | |
| 2010/0019616 | A1 | 1/2010 | Naruse et al. | |
| 2010/0164322 | A1* | 7/2010 | Sashida | H02N 1/004 310/300 |
| 2011/0062820 | A1* | 3/2011 | Aoyagi | H02N 1/08 310/300 |
| 2011/0108838 | A1 | 5/2011 | Kageyama | |

(Continued)

FOREIGN PATENT DOCUMENTS

| JP | 05-056666 | 3/1993 |
|---|---|---|
| JP | 07-147786 | 6/1995 |

(Continued)

OTHER PUBLICATIONS

Edamoto et al., "Low-Resonant-Frequency Micro Electret Generator for Energy Harvesting Application," Proc. IEEE Int. Conf. MEMS, pp. 1059-1062, 2009.

(Continued)

*Primary Examiner* — John K Kim
(74) *Attorney, Agent, or Firm* — Fish & Richardson P.C.

(57) ABSTRACT

Provided is a power generation device having a dielectric body and an electret, where power is generated by varying the distance between the dielectric body and the electret. A first electrode is connected to the electret on a side not facing the dielectric body. The first electrode is connected to a grounding terminal via a load. A second electrode may be connected to the dielectric body on a side not facing the electret. The second electrode may be directly connected to the grounding terminal.

22 Claims, 33 Drawing Sheets

(56) References Cited

U.S. PATENT DOCUMENTS

| | | | | |
|---|---|---|---|---|
| 2011/0316384 A1* | 12/2011 | Nakatsuka | ............... | H02N 1/08 310/300 |
| 2012/0169179 A1* | 7/2012 | Masaki | ................ | H02N 1/08 310/300 |
| 2012/0217842 A1* | 8/2012 | Naruse | ................ | H02N 1/006 310/309 |
| 2013/0057110 A1* | 3/2013 | Aoyagi et al. | ................ | 310/300 |
| 2013/0134830 A1 | 5/2013 | Ikuta et al. | | |

FOREIGN PATENT DOCUMENTS

| | | |
|---|---|---|
| JP | 2002-165468 | 6/2002 |
| JP | 2004-186732 | 7/2004 |
| JP | 2005-529574 | 9/2005 |
| JP | 2006-066178 | 3/2006 |
| JP | 2007-312551 | 11/2007 |
| JP | 2010-068643 | 3/2008 |
| JP | 2008-086190 | 4/2008 |
| JP | 2009-081950 | 4/2009 |
| JP | 2011-078198 | 4/2011 |
| JP | 2011-101499 | 5/2011 |
| WO | 2008/026407 | 3/2008 |
| WO | 2009-125773 | 10/2009 |
| WO | 2011/052106 | 5/2011 |
| WO | 2011-086830 | 7/2011 |

OTHER PUBLICATIONS

Naruse et al., "Electrostatic Micro Power Generator From Low Frequency Vibration Such as Human Motion," Proceedings of Power MEMS 2008+ microMEMS 2008, Sendai, Japan, Nov. 9-12, 2008.

* cited by examiner

FIG. 5

| Rv [MΩ] | Vpp [V] | Pm [μW] |
|---|---|---|
| 47.6 | 0.52 | 161 |
| 40 | 0.5 | 125 |
| 32 | 1.04 | 434 |
| 22 | 1.54 | 655 |
| 12 | 2.5 | 945 |
| 10 | 2.78 | 975 |
| 2 | 3.78 | 375 |

_US 9,413,272 B2_

POWER GENERATION DEVICE HAVING A DIELECTRIC BODY AND AN ELECTRET

This application is based on Japanese Patent Application No. 2011-190391 filed Sep. 1, 2011, the contents of which are hereby incorporated by reference.

BACKGROUND OF THE INVENTION

1. Field of the Invention

The present invention relates to a power generation device that generates energy (converting energy from kinetic energy (energy of vibration) to electrical energy) by varying the distance between a dielectric body and an electret; and in particular to a capacitive power generation device of vibratory drive design, manufactured employing a micro electromechanical system (MEMS) technique.

2. Description of Related Art

FIG. 33 is a schematic diagram showing a prior art example of a vibratory power generation device. In FIG. 33, reference numeral 101 designates an upper substrate, reference numeral 102 designates a lower substrate, reference numeral 103 designates an electret, reference numeral 104 designates an opposite electrode, reference numeral 105 designates a base electrode, and reference numeral designates 106 a spring. The upper substrate 101 is a moveable body that is elastically supported so as to be displaceable in two axial planar directions (an X direction and a Y direction) with respect to the lower substrate 102.

The basic principle of operation of a vibratory power generation device having the aforementioned configuration is a system whereby the surface area of overlap of the electret 103 and the opposite electrode 104 is varied through vibration in two axial planar directions (the X direction and the Y direction) while maintaining a predetermined gap distance, to extract, in the form of electrical current, changes in electric charge induced in the opposite electrode 104 (a so-called electrostatic induction system).

As techniques related to vibratory power generation devices manufactured employing MEMS techniques, there may be cited Patent Document 1 (Japanese Laid-Open Patent Application 2007-312551); Non-patent Document 1 (Y. Naruse, N. Matsubara, K. Mabuchi, M. Izumi, K. Honma, "ELECTROSTATIC MICRO POWER GENERATOR FROM LOW FREQUENCY VIBRATION SUCH AS HUMAN MOTION", Proceedings of PowerMEMS 2008+, Sendai, Japan, Nov. 9-12, (2008); and Non-patent Document 2 (M. Edamoto, Y. Suzuki, N. Kasagi, K. Kashiwagi, Y. Morizawa, T. Yokoyama, T. Seki, and M. Oba, "LOW-RESONANT-FREQUENCY MICRO ELECTRET GENERATOR FOR ENERGY HARVESTING APPLICATION", Proc. IEEE Int. Conf. MEMS 2009, Sorrento, (2009), pp. 1059-1062.

However, in the aforementioned vibratory power generation device of the prior art, the generated power is at most on a microwatt scale, and applications for it were limited.

Moreover, the aforementioned vibratory power generation device of the prior art has a structure in which the electret 103 and the opposite electrode 104 are facing one another, and when the gap distance between the electret 103 and the opposite electrode 104 is designed too small, electrostatic attraction acting between the electret 103 and the opposite electrode 104 poses a risk of the two coming into contact, or of the charge introduced from the electret 103 being discharged. For this reason, the gap distance between the electret 103 and the opposite electrode 104 must be designed to be somewhat large, but having thusly expanded the gap distance, it now becomes necessary to design the electret 103 and the opposite electrode 104 to have large surface areas, in order for vibration-induced change in capacity to be large, giving rise as a result to a negative cycle whereby the gap distance must be expanded even further. Due to this sort of negative cycle, in the aforementioned vibratory power generation device of the prior art, it has been difficult to miniaturize the device and/or reduce the gap size, while boosting the generated power.

SUMMARY OF THE INVENTION

With the foregoing in view, it is an object of the present invention to offer a compact, high-output power generation device.

In order to achieve the aforementioned object, the power generation device according to the present invention has a dielectric body and an electret, the distance between the dielectric body and the electret being varied, whereby power is generated.

These and other characteristics, elements, steps, advantages, and features of the present invention will be apparent from the following detailed description of the preferred embodiments and the appended drawings relating thereto.

BRIEF DESCRIPTION OF THE DRAWINGS

FIG. 5 is a table showing the relationship among variable resistance, output voltage, and generated power;

DETAILED DESCRIPTION OF PREFERRED EMBODIMENTS (First Configuration Example)

Figure 1:
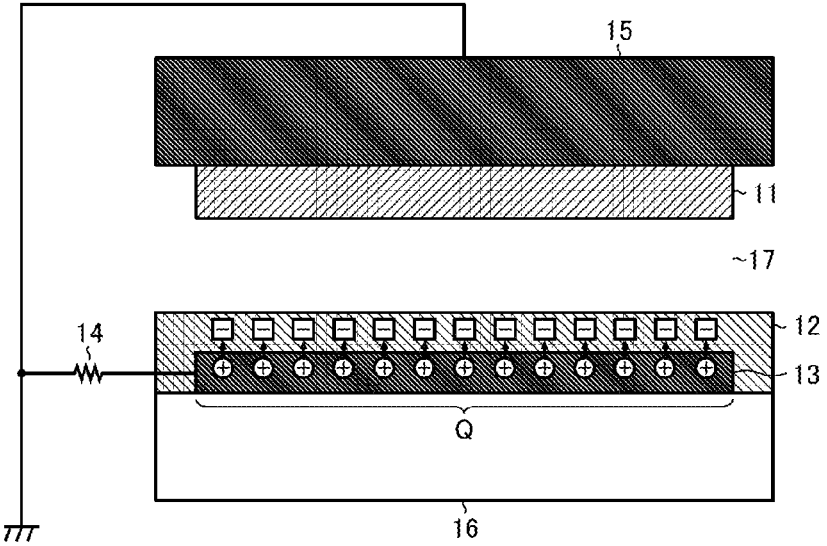
FIG. 1 is a schematic diagram showing a first configuration example of a power generation device.
Figure 1:
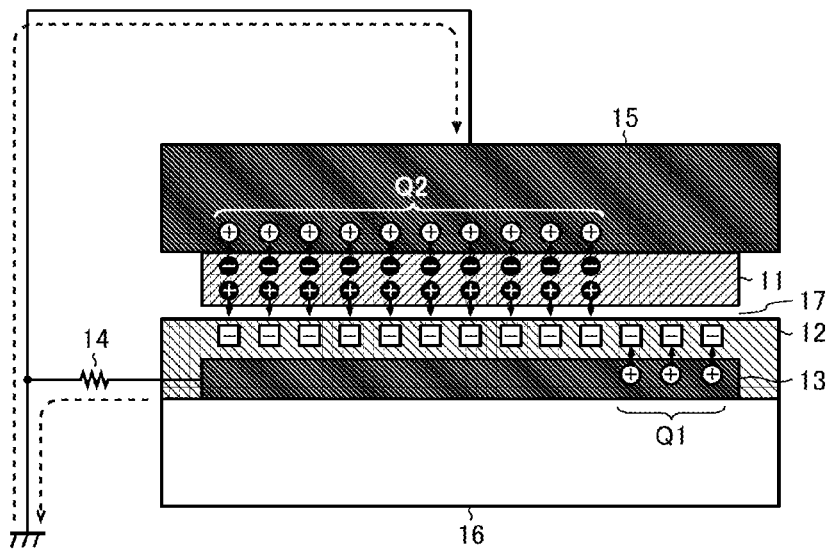

FIG. 1 is a schematic diagram showing a first configuration example of a power generation device (a sectional view seen in a lateral direction). The power generation device 10 of the first configuration example has a dielectric body 11, an electret 12, a lower electrode 13, a resistor 14, an upper electrode 15, a substrate 16, and a gap layer 17. At the top in FIG. 1, the power generation device 10 is depicted in a first state (a state in which the dielectric body 11 and the electret 12 are spaced apart), while at the bottom in FIG. 1, the power generation device 10 is depicted in a second state (a state in which the dielectric body 11 and the electret 12 are close together).

Herein, for the sake of convenience in description, where not specified otherwise, the upper edge side of the page is defined as the vertically upward direction, and the description is premised on a configuration in which the dielectric body 11 vibrates in the up-and-down direction (vertical direction); however, the direction of vibration of the dielectric body 11 is not limited thereto; it also being possible, for example, to configure the dielectric body to vibrate in the left-and-right direction (horizontal direction) through 90-degree rotation of the page.

The dielectric body 11 is a moveable body, the relative position of which varies with respect to the electret 12 due to vibration imparted to the power generation device 10. The bottom face of the dielectric body 11 faces the top face of the electret 12 with the gap layer 17 therebetween. Lead zirconate titanate (PZT), barium titanate (BTO), or the like can be employed as the dielectric body 11. This will be discussed below. The dielectric body 11 may be formed to a plate shape or to a film shape. For example, the substrate itself may be formed by a dielectric body; a dielectric body film may formed over the substrate by a thin-film printing technique; or a dielectric body of plate shape formed by a separate process may be adhered onto the substrate.

The electret 12 is a member that retains a quasi-permanent electric charge. As the electret 12, there may be employed an organic electret that retains an electric charge in a polymer compound, such as CYTOP™; or an inorganic electret that retains an electric charge in a substrate of silicon oxide ($SiO_2$), silicon nitride (SiN), or the like. The electret 12 is formed so as to cover the entire surface of the lower electrode 13. By adopting such a configuration whereby the lower electrode 13 is not exposed, outflow of charge to the exposed lower electrode 13 when a charge is introduced to the electret 12 can be prevented, and therefore it is possible to increase the efficiency at which charge is introduced to the electret 12.

The lower electrode 13 corresponds to a first electrode which is connected to the bottom face side of the electret 12 (the side not facing toward the dielectric body 11). The lower electrode 13 is connected to a grounding terminal via the resistor 14. An aluminum electrode or the like can be employed as the lower electrode 13.

The resistor 14 is a load for drawing, in the form of a voltage, electrical current flowing between the lower electrode 13 and the grounding terminal due to vibration of the power generation device 10.

The upper electrode 15 corresponds to a second electrode which is connected to the top face of the dielectric body 11 (the side not facing toward the electret 12). The upper electrode 15 is directly connected to the grounding terminal. An aluminum electrode or the like can be employed as the upper electrode 15.

The substrate 16 is a plate-shaped member for supporting the electret 12 and the lower electrode 13. A quartz substrate, a silicon wafer having an oxide film, or the like can be employed as the substrate 16. However, from the standpoint of minimizing parasitic capacitance, it is more preferable to employ a quartz substrate or the like, than a silicon wafer having an oxide film.

The gap layer 17 is a gap present between the dielectric body 11 and the electret 12. The thickness of the gap layer 17 (the gap distance separating the dielectric body 11 and the electret 12) varies due to displacement of the dielectric body 11 in association with vibration. The gap layer 17 may be placed in a low vacuum state (a state that is neither a high vacuum state nor an ultrahigh vacuum state), or filled with air, with an inert gas ($N_2$ or the like), with a gas having discharge-preventive effect (for example, a gas containing $SF_6$ as the principal component), or the like. In a case in which the gap layer 17 is placed in a low vacuum state, a degassing step may be employed, or a phenomenon whereby gas is removed from the gap layer 17 during some high-temperature process, creating a low vacuum state naturally, may be utilized. The reason it is undesirable to place the gap layer 17 in a high vacuum state or an ultrahigh vacuum state is so as to avoid discharge of the electret 12. Herein, a "low vacuum state" refers to a state of atmospheric pressure to $10^{-1}$ Pa; a "high vacuum state" refers to a state of $10^{-1}$-$10^{-5}$ Pa, and an "ultrahigh vacuum state" refers to a state of $10^{-5}$ Pa or below. When moisture is contained in the gap layer 17, water molecules tend to settle on the surface of the electret 12 and remove charge, and it is therefore preferable to sufficient eliminate moisture contained in the gap layer 17 and bring about a low humidity state.

In the aforementioned manner, the power generation device 10 of the first configuration example has at least one dielectric body 11/electret 12 pair, and is configured to generate power by varying the gap distance between the dielectric body 11 and the electret 12. The basic principle of power generation is described below.

With the power generation device 10 in the first state (a state in which the dielectric body 11 and the electret 12 are spaced apart) as shown at the top in FIG. 1, attracted by negative fixed charges (in FIG. 1, portrayed as symbols of white squares with minus signs) held by the electret 12, intrametallic positive charges (in FIG. 1, portrayed as symbols of white circles with plus signs) are induced on the surface of the lower electrode 13 (the interface with the electret 12). These intrametallic positive charges assume the character of positive charges that arise as a result of free electrons being expelled from sites within the lower electrode 13 (metal), creating potential difference from surrounding free electrons. Consequently, with regard to the aforementioned physical phenomenon, it is more correct to say free electrons within the lower electrode 13 are pushed out, rather than that positive charges within the lower electrode 13 are attracted by negative fixed charges held by the electret 12. The intrametallic positive charges within the lower electrode 13 are supplied from the grounding terminal (the free electrons within the lower electrode 13 move to the grounding terminal), and therefore the potential of the lower electrode 13 remains at 0 V.

On the other hand, upon transition of the power generation device 10 from the first state to the second state (a state in which the dielectric body 11 and the electret 12 are close together) as shown at the bottom in FIG. 1, the interior of the dielectric body 11 becomes polarized due to the negative fixed charges held by the electret 12, and positive polarized charges (in FIG. 1, portrayed as symbols of black circles with plus signs) become localized at the bottom surface of the dielectric body 11. At this time, (a portion of) the correspondence relationships between the positive charges within the lower electrode 13 and the negative charges within the electret 12 which arose in the first state are now dissolved. Due to this phenomenon, a transitory surplus of positive charges arises within the lower electrode 13. However, because the lower electrode 13 is connected to the grounding terminal via the resistor 14, movement of the surplus positive charges (electrical current) from the lower electrode 13 to the grounding terminal arises, until the transitory rise in potential of the lower electrode 13 returns to 0 V. The bottom of FIG. 1 shows a state subsequent to movement of a portion of the positive charges from the lower electrode 13. The remaining charges that have not flowed out from the lower electrode 13 are denoted by Q1.

When, in the opposite of the above process, the power generation device 10 has transitioned from the second state to the first state, movement of positive charges (i.e., electrical current) from the grounding terminal to the lower electrode 13 arises, and therefore this electrical current can be drawn out as electrical energy.

In the second state of the power generation device 10, negative polarized charges (in FIG. 1, portrayed as symbols of black circles with minus signs) become localized at the top surface of the dielectric body 11, due to internal polarization of the dielectric body 11. Consequently, at the top surface of the upper electrode 15 (the interface with the dielectric body 11), intrametallic positive charges are induced through attraction to the aforementioned negative polarized charges. However, because the intrametallic positive charges within the upper electrode 15 are supplied from the grounding terminal, the potential of the upper electrode 15 remains at 0 V.

Viewed in electromagnetic terms, the second state of the power generation device 10 is a state of lower electrostatic potential energy than the first state (a stable state in which distances between positive charges and negative charges are closer together than in the first state). Consequently, when the power generation device 10 is transitioned between the first state and the second state by imparting kinetic energy (vibration) from the outside, it is possible for kinetic energy to be converted to electrical energy.

In particular, the power generation device 10 of the first configuration example is configured to be furnished with the upper electrode 15 on the top face of the dielectric body 11, with this upper electrode 15 connected to the grounding terminal. Because of this configuration, in the second state of the power generation device 10, no potential difference arises in the interior of the upper electrode 15, and therefore it is possible to drag down the potential energy of the second state, and increase the generation efficiency.

(Equivalent Circuit Diagram)

Figure 2:
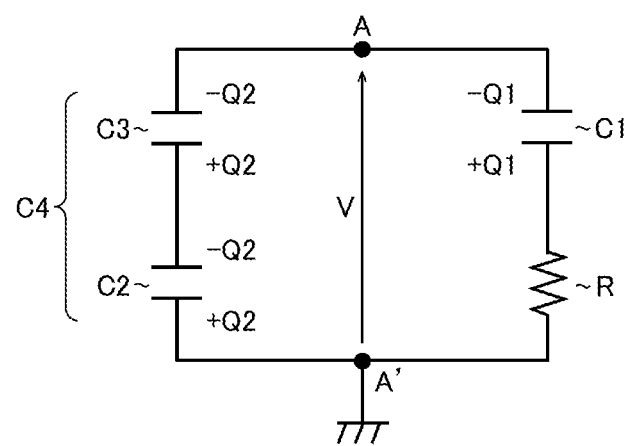
FIG. 2 is an equivalent circuit diagram of a power generation device.

FIG. 2 is an equivalent circuit diagram of the power generation device 10. Sign C1 shows electrostatic capacitance (fixed value) of the electret 12, sign C2 shows electrostatic capacitance (fixed value) of the dielectric body 11, sign C3 shows electrostatic capacitance (variable value) of the gap layer, and sign C4 shows serial composition of capacitance of the dielectric body 11 and the gap layer 17 ($C4=C2 \times C3/(C2+C3)$). Sign R shows the resistance value (fixed value) of the resistor 14.

The most notable point in this equivalent circuit diagram is that the electret 12, which fulfills the role of the power supply, should be called a "constant charge supply" that retains a constant charge Q.

When the power generation device 10 is transitioned from the first state (top in FIG. 2) to the second state (bottom in FIG. 1), charge is distributed to the dielectric body 11 side as well. As the electrostatic capacitance of a capacitor distributed to a constant charge increases, the potential of the capacitor decreases. In terms of a phenomenon, this is equivalent to a case in which a capacitor is charged with a charge, then disconnected from the power supply and connected to another capacitor.

At this time, where Q1 denotes charge remaining in the capacitor between the electret 12 and the lower electrode 13, Q2 denotes charge paired with induced charge in the dielectric body 11, and V denotes potential difference between contacts A-A', the following Equation (1) and Equation (2) apply.

$$Q = Q1 + Q2 \qquad (1)$$

$$V = Q1/C1 = Q2/C4 \qquad (2)$$

From the aforementioned Equation (1) and Equation (2), the charge Q1 is represented by the following Equation (3):

$$Q1 = Q1 \times C1/(C1+C4) \qquad (3)$$

In Equation (3), the electrostatic capacitance C1 and the charge Q of the electret 12 are fixed values, whereas the serial composition of capacitance C4 of the dielectric body 11 and the gap layer 17 is a variable value that varies depending on the thickness of the gap layer 17 (and, hence, on the electrostatic capacitance C3 of the gap layer 17). Consequently, as the serial composition of capacitance C4 varies in response to displacement of the dielectric body 11 in association with vibration, the ratio of charge Q2 and charge Q1 will vary. In the power generation device 10, the redistribution of charge associated with this change in capacitance is drawn out as electrical current.

Generating capacity is formulated as follows. The electrical current i flowing through a circuit at given time t is given by the time derivative of the charge Q1. Where the time derivative of a given function f is denoted by f', the electrical current i is represented by the following Equation (4), based on the aforementioned Equation (3):

$$\begin{aligned} i &= Q1' \\ &= \{Q \times C1 \times (C1+C4)^{-1})\}' \\ &= Q \times C1 \times \{(C1+C4)^{-1}\}' \\ &= Q \times C1 \times \{-(C1+C4)^{-2}\} \times C4' \end{aligned} \quad (4)$$

Moreover, the serial composition of capacitance C4 of the gap layer 17 is represented by the following Equation (5), employing the electrostatic capacitance C2 of the dielectric body 11 and the electrostatic capacitance C3 of the gap layer 17:

$$C4 = (C2^{-1} + C3^{-1})^{-1} \quad (5)$$

From the aforementioned Equation (5), the time derivative C4' of the serial composition of capacitance C4 is represented by the following Equation (6):

$$\begin{aligned} C4' &= \{(C2^{-1} + C3^{-1})^{-1}\}' \\ &= \{(C3/C2+1)^{-2}\} \times C3' \end{aligned} \quad (6)$$

As the gap distance between the dielectric body 11 and the electret 12 varies time-wise, the electrostatic capacitance C3 of the gap layer 17 simultaneously varies as well. Here, in a case in which the gap distance of the dielectric body 11 and the electret 12 in the initial state is denoted as X0, and additionally the dielectric body 11 is experiencing simple harmonic motion at an amplitude A and an angular velocity ω, the capacitance C3 of the gap layer 17 and the time derivative C3' thereof are represented by Equation (7) and Equation (8). The sign ∈0 in the equations is the dielectric constant of a vacuum (8.85×10⁻¹² F/m).

$$C3 = \in_0 \times \in r \times S \times \{X0 + A \times \sin(\omega t)\}^{-1} \quad (7)$$

$$C3' = -\in_0 \times \in r \times S \times A \times \omega \times \cos(\omega t) \times \{X0 + A \times \sin(\omega t)\}^{-2} \quad (8)$$

The voltage V2 output from both terminals of the resistor 14 furnished to the power generation device 10, due to the flow of electrical current i, is represented by Equation (9), employing the resistance value R of the resistor 14:

$$V2 = i \times R \quad (9)$$

The power P drawn from the resistor 14 is represented by Equation (10), employing the average value I of the electrical current i and the resistance value R of the resistor 14. The sign T in the equation is the vibration period of the dielectric body 11, and is given by T=2×π/ω.

$$P = I^2 \times R = T^{-1} \times \int_0^T i^2 dt \times R \quad (10)$$

Figure 8A:
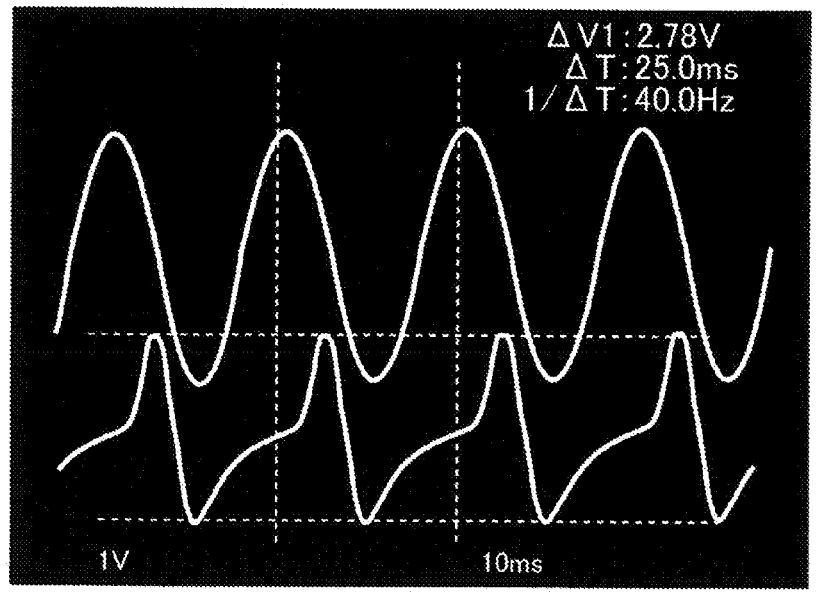
FIG. 8A is an oscilloscope waveform chart at maximum power output.
Figure 8B:
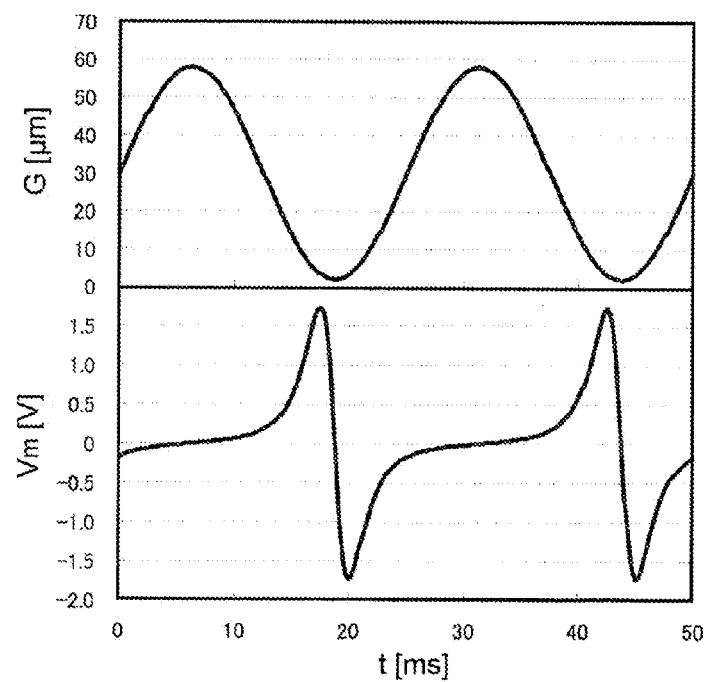
FIG. 8B is a simulation waveform of output voltage Vm versus gap distance G.

Simulation values of output voltage waveforms based on the aforementioned Equation (9) are shown in FIG. 8B. An output waveform based on this formulation is not a sine wave, but rather a waveform theoretically distorted from a sine wave (discussed in detail below).

Here, the gap layer 17 present between the dielectric body 11 and the electret 12 plays a useful role. The greater the electrostatic capacitance C3 of the gap layer 17 is, specifically, the smaller the thickness (gap distance) of the gap layer 17 is, the greater is the amount of polarized charge in the dielectric body 11, and the generating capacity increases in accordance therewith.

Figure 33:
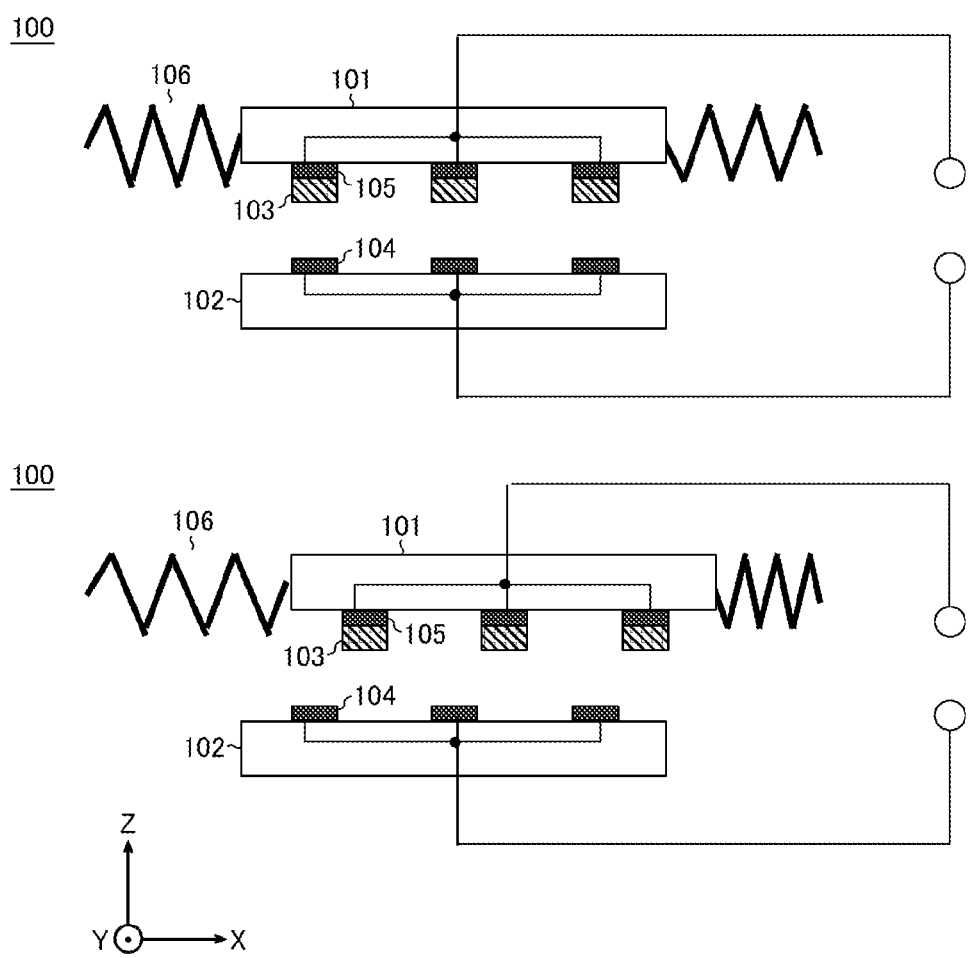
FIG. 33 is a schematic diagram showing a prior art example of a vibratory power generation device.

As stated previously, the power generation device 10 of the first configuration example differs from the prior art configuration in which the electret and the opposite electrode face one another (see FIG. 33), in that the dielectric body 11 and the electret 12 face one another, and therefore even if the dielectric body 11 and the electret 12 are close (or touching), discharge of the electret 12 basically does not arise.

Consequently, with the power generation device 10 of the first configuration example, when generating power in response to changes in the gap distance separating the dielectric body 11 and the electret 12, the dielectric body 11 and the electret 12 can be brought closer together until the gap distance reaches its minimum of zero, whereby it is possible to obtain extremely large generating capacity (on a milliwatt scale).

(Power Generation Test)
(Measurement System)

Figure 3:
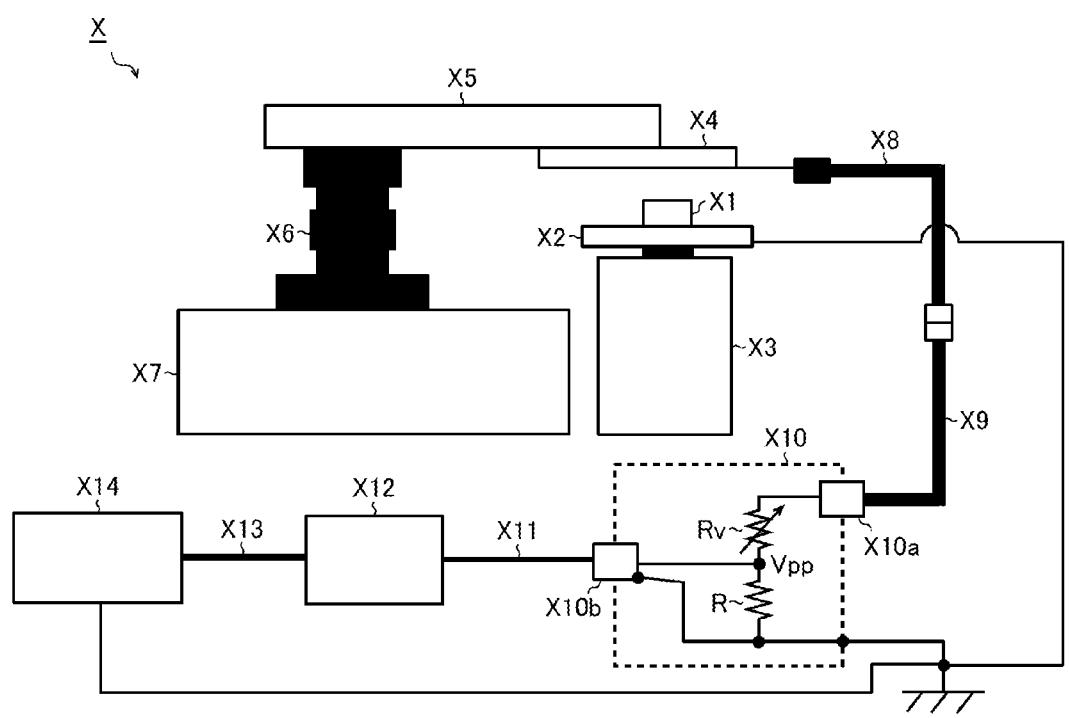
FIG. 3 is a simplified diagram of a measurement system.

FIG. 3 is a simplified diagram of a measurement system employed in a power generation test. The measurement system X employed in this power generation test includes a dielectric body X1, an aluminum panel X2, an electromagnetic type vibration exciter X3, a test sample X4, an aluminum panel X5, a three-axis stage X6, a base X7, a coaxial cable X8, a coaxial cable X9, a shield case X10, a coaxial cable X11, a low-pass filter X12, a coaxial cable X13, and an oscilloscope X14.

The dielectric body X1 (which corresponds to the dielectric body 11 of FIG. 1) is arranged with the top face facing towards the bottom surface of the test sample X4, and the bottom surface is connected to the aluminum panel X2. Lead zirconate titanate (PZT) is employed as the dielectric body X1 (the dielectric constant of the PZT used in the test is 2,600).

The aluminum panel X2 (which corresponds to the upper electrode 15 of FIG. 1) is connected at the top surface thereof to the dielectric body X1. The aluminum panel X2 is directly connected to the grounding terminal of the measurement system X.

The electromagnetic type vibration exciter X3 imparts vibration (of 40 Hz frequency) in the up-and-down direction to the dielectric body X1 which is connected to the top surface of the aluminum panel X2.

The test sample X4 (which corresponds to the electret 12, the lower electrode 13, and the substrate 16 of FIG. 1) is connected at a quartz substrate at the upper surface side thereof (thickness: 1.0 mm) to the aluminum panel X5, while an electret at the lower surface side thereof (thickness: 5.6 μm) faces towards the dielectric body X1. CYTOP™ is employed as the electret. No patterning has been carried out on the electret. Meanwhile, patterning to pectinate array shape (width: 30 μm, pitch: 60 μm) has been carried out on the lower electrode, which is covered by the electret. The lower electrode is connected to a first terminal of the coaxial cable X8.

The aluminum panel X5 provides support to the test sample X4.

The test sample X4 supported on the aluminum panel X5 is moved in three axial directions by the three-axis stage X6.

The base X7 provides support to the three-axis stage X6.

The coaxial cable X8 is connected at a first terminal thereof to the lower electrode of the test sample X4, and at a second terminal thereof to a first terminal of the coaxial cable X9.

The coaxial cable X9 is connected at a first terminal thereof to a second terminal of the coaxial cable X8, and at a second terminal thereof to a first connector X10a of the shield case X10.

The shield case X10 houses load resistances Rv, R (the resistor 14 of FIG. 1 corresponds to the serial composition of resistance of Rv and R). The main body of the shield case X10 is connected to the grounding terminal of the measurement system X. The first connector X10a of the shield case X10 is connected to the grounding terminal of the measurement system X via the load resistances Rv, R. In this way, in the measurement system X, the test sample X4 and the load resistances Rv, R are connected by a coaxial wire, not by a lead wire. The connection node of the load resistances Rv, R connects to a second connector X10b of the shield case X10 as the measurement node for output voltage Vm. The ground line of the second connector X10b is connected to the grounding terminal of the measurement system X. Of the load resistances Rv, R, the resistance Rv that is connected between the first connector X10a and the second connector X10b (the resistance for which voltage at either terminal is not measured) is a variable resistance (a potentiometer), whereas the resistance R that is connected between the second connector X10b and the grounding terminal (the resistance for which voltage at either terminal is measured as the output voltage Vm) is a fixed resistance (100 kΩ).

The coaxial cable X11 connects the second connector X10b of the shield case X10 and the input terminal of the low-pass filter X12.

The low-pass filter X12 eliminates noise that overlaps the output voltage Vm. The cutoff frequency fc of the low-pass filter X12 is set to 200 Hz.

The coaxial cable X13 connects the output terminal of the low-pass filter X12 and the input terminal of the oscilloscope X14.

The oscilloscope X14 displays the waveform of the output voltage Vm (temporal variation of the electrical signal) in the form of a graph. In the graph displayed by the oscilloscope X14, the vertical axis is output voltage, and the horizontal axis is time. The ground terminal of the oscilloscope X14 is connected to the grounding terminal of the measurement system X.

(Test Procedure)

Figure 4:
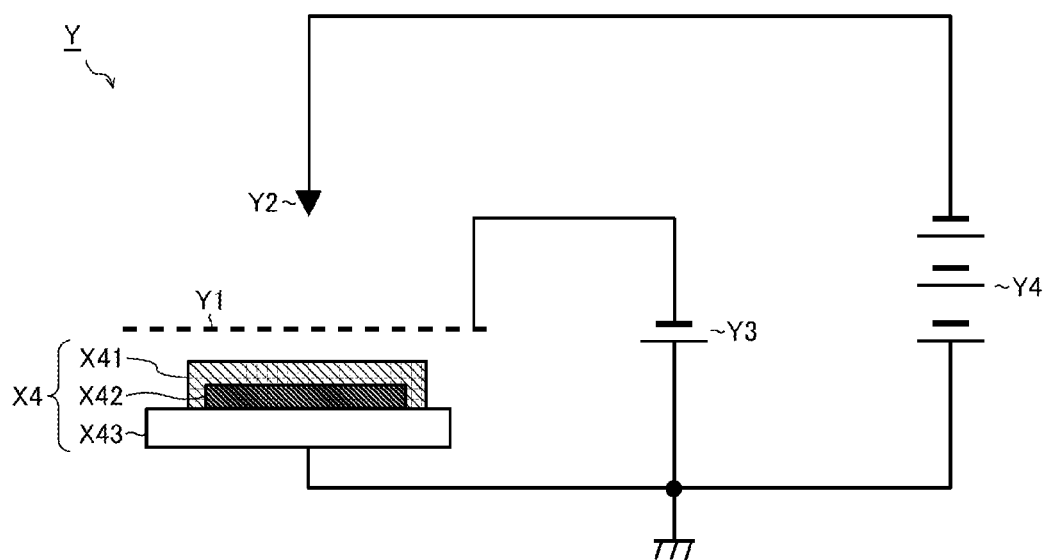
FIG. 4 is a descriptive diagram of a corona discharge device.

The test procedure employing the measurement system X is as follows. In Step S1, a corona discharge device Y shown in FIG. 4 is employed under predetermined conditions (corona discharge voltage: 10 kV, 0.1 mA; grid voltage: 1.5 kV) to introduce a charge into the electret of the test sample X4. In FIG. 4, signs X41, X42, and X43 respectively show the constituent elements (the electret, the lower electrode, and the substrate) that form the test sample X. Signs Y1 to Y4 respectively show the constituent elements (a grid, a discharge electrode needle, a grid power supply, a DC high voltage power supply) forming the corona discharge device Y. In Step S2, the surface potential of the test sample X4 is measured. In Step S3, the test sample X4 is connected to the measurement system X. In Step S4, the dielectric body X1 is vibrated by the electromagnetic type vibration exciter X3. In Step S5, the waveform of the output voltage Vm arising in response to the dielectric body X1 and the test sample X4 moving closer together/apart is observed with the oscilloscope. In Step S6, Step S4 to Step S6 are repeated while varying the resistance value of the variable resistance Rv. In Step S7, the output power P of the power generation device 10 is calculated based on the output voltage Vm thusly obtained.

Firstly, the average value Vms of the output voltage Vm is calculated from (11), following:

$$Vms = T^{-1} \times \int_0^T Vm \, dt \qquad (11)$$

However, in a case in which the waveform of the output voltage Vm approximates a sine wave, by measuring the maximum amplitude Vpp (the peak-to-peak value) of the output voltage Vm, it is possible to derive an estimate value of the average value Vms, from the equation $Vms \approx 0.354 \times Vpp$.

Next, the voltage VL at which the load resistance (R+Rv) is generated is calculated by the following Equation (12).

$$VL = Vms \times (R+Rv)/R \qquad (12)$$

Then, employing the following Equation (13), the generated power P can be calculated from the voltage VL.

$$P = VL^2/(R+Rv) \qquad (13)$$

(Test Results)

First, the results of measuring surface potential of the test sample X4 are described. Subsequent to the introduction of charge in Step S1, the average potential at the test sample X4 surface was approximately −525 V.

Figure 6:
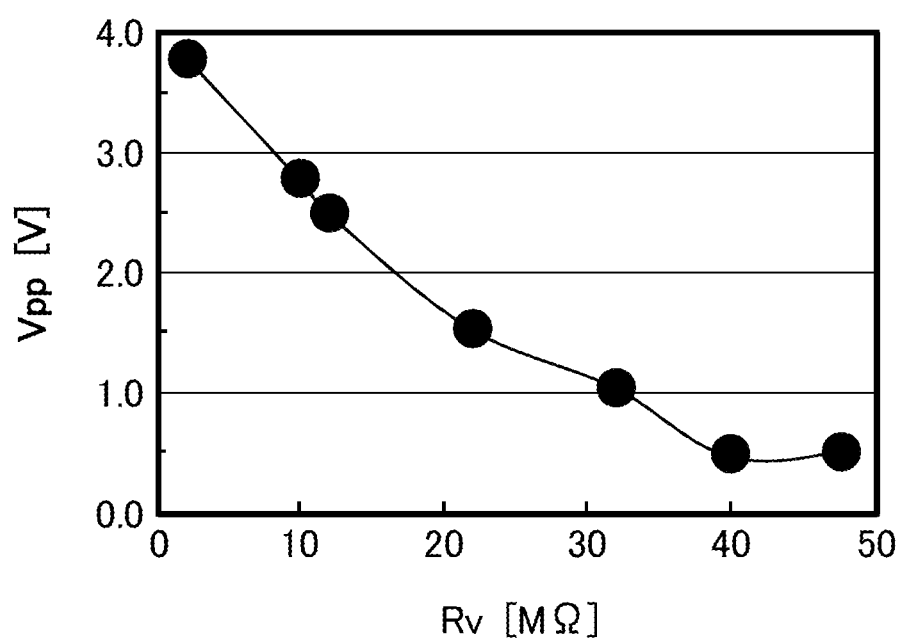
FIG. 6 is a graph showing the relationship between variable resistance and output voltage.
Figure 7:
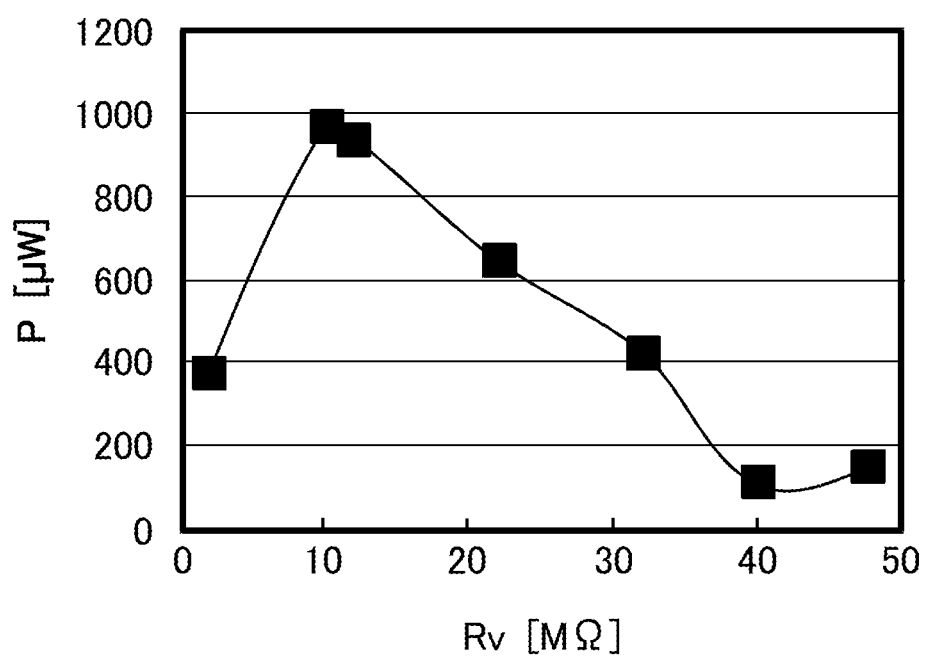
FIG. 7 is a graph showing the relationship between variable resistance and generated power.

Next, the results of vibratory power generation test carried out while varying the resistance value of the variable resistance Rv are described. FIG. 5 is a table showing the relationship among variable resistance Rv (MΩ), maximum amplitude Vpp of the output voltage Vm (V), and generated power Pm (μW). FIG. 6 is a graph showing the relationship between variable resistance Rv (MΩ) and maximum amplitude Vpp of the output voltage Vm (V). FIG. 7 is a graph showing the relationship between variable resistance Rv (MΩ) and generated power Pm (μW). It was confirmed that the generated power Pm reaches maximum (975 μW=0.97 mW) when the variable resistance Rv is 10 MΩ. In this way, in the vibratory power generation test employing the measurement system X, exceedingly large generating capacity (on a milliwatt scale) can be obtained.

FIG. 8A is an oscilloscope waveform chart at maximum power output. The driving waveform of a vibration simulator is shown at top in FIG. 8A. It will be appreciated that, since the drive signal is a sine wave, the dielectric body X4 provided to the electromagnetic type vibration exciter X3 experiences simple harmonic motion. On the other hand, the output waveform of the output voltage Vm is depicted at bottom in FIG. 8A. The output waveform of the output voltage Vm is a shape that differs from a sine wave. However, this waveform is a theoretically correct waveform, not a sine wave distorted by disturbance elements such as noise. This will be described in the next section.

FIG. 8B is a simulation waveform of the output voltage Vm versus the gap distance G. The gap distance of the test sample X1 and the dielectric body X4 is depicted at the top in FIG. 8B, and the output voltage Vm of the measurement system X theoretically calculated employing the previously cited Equation (3) to Equation (9) is depicted at the bottom in FIG. 8B. As the parameters used in the computations, numerical values identical to the parameters belonging to the test sample X1, the dielectric body X4, and the resistances R and Rv employed in the measurement system X used in the actual power generation test were input. However, for the initial value of the gap distance G of the test sample X1 and the dielectric body X4 (specifically, X0 in Equation (7)), and for the amplitude of vibration imparted to the dielectric body X4 by the electromagnetic type vibration exciter X3 (specifically, A in Equation (7)), correct numerical values could not be measured. Accordingly, mathematical operations were performed on the hypothesis that gap distance G of the test sample X1 and the dielectric body X4 varies in the manner shown by the waveform depicted at the top in FIG. 8B. The waveforms of FIG. 8A and FIG. 8B match extremely well, and it can considered proven that measured output voltage Vm is outputted as the result of power generation based on the proposed basic principle.

Figure 9:
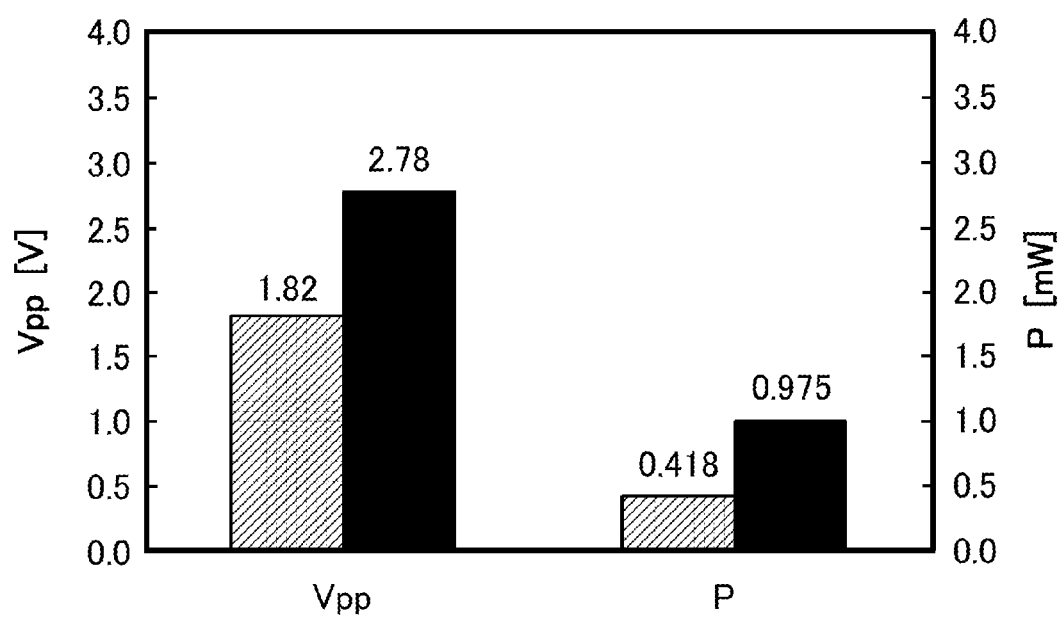
FIG. 9 is a comparison diagram of generating capacity according to the state of electrical connection at the back surface of a dielectric body.

Next, the relationship between the generating capacity and the electrical connection of the aluminum plate X2 at the back surface of the dielectric body X1 will be described. A vibratory power generation test analogous to that above was performed in a state in which the aluminum plate X2 was disconnected from the grounding terminal. FIG. 9 is a comparison diagram of generating capacity according to the state of electrical connection at the back surface of the dielectric body X1. As shown in FIG. 9, it was verified that, between the case in which the aluminum plate X2 is connected to the grounding terminal (the black bar graph) in the measurement system X versus the case in which it is not connected (the hatched bar graph), differences arise both in the maximum amplitude Vpp of the output voltage Vm and in the generated power Pm. This phenomenon will be discussed in detail while citing the following second configuration example and third configuration example.

(Second Configuration Example)

Figure 10:
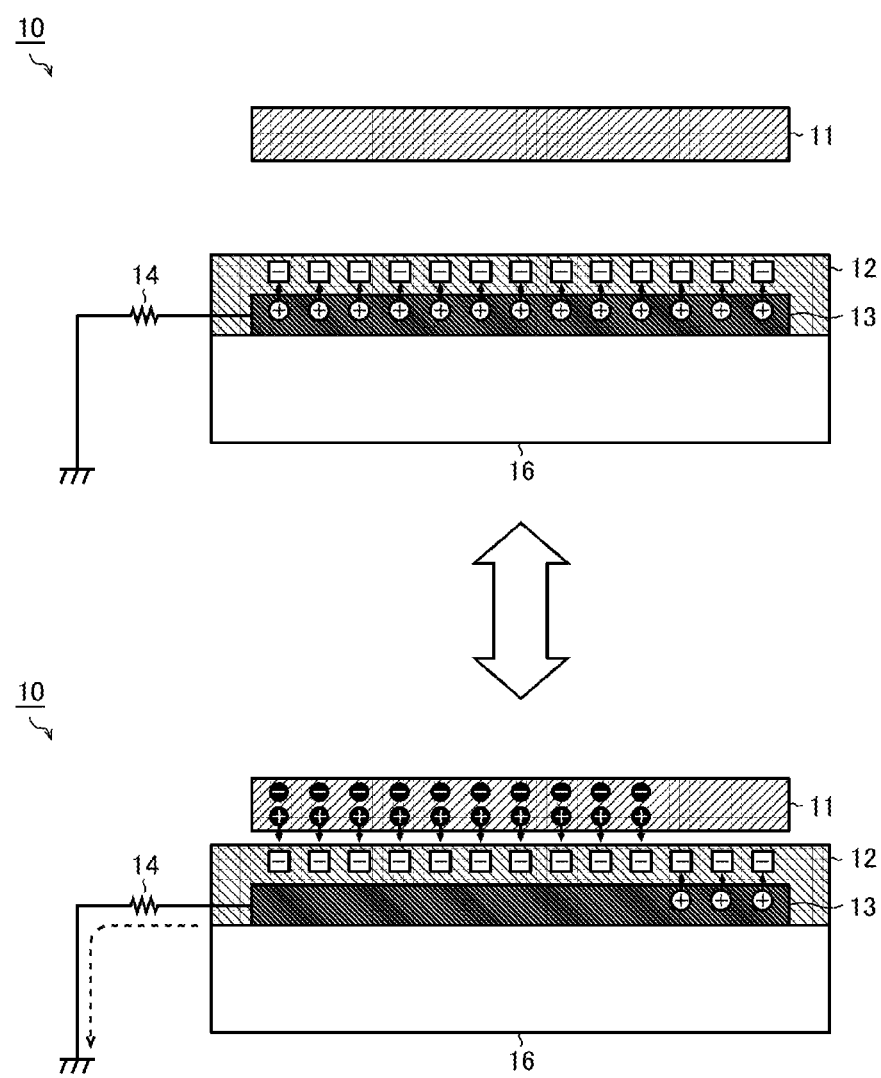
FIG. 10 is a schematic diagram showing a second configuration example of a power generation device.

FIG. 10 is a schematic diagram showing a second configuration example of a power generation device. The power generation device 10 of the second configuration example is substantially analogous in configuration to that of the first configuration example, but has the feature that the upper electrode 15 that was furnished on the top surface side of the dielectric body 11 has been removed. Specifically, the power generation device 10 of the second configuration example can be considered to have a configuration in which the dielectric body 11 is unconnected to any electrode. Viewed another way, the power generation device 10 of the second configuration example can be considered to have a configuration in which the entire movable section, including the dielectric body 11, is in an electrically floating state (a state of being unconnected to any potential point). The entire movable section, including the dielectric body 11, may be retained by, for example, an insulator (an insulating spring or the like).

The power generation device 10 of the second configuration example differs from the preceding first configuration example in that, in the second state in which the dielectric body 11 and the electret 12 are brought close together (at bottom in FIG. 10), it assumes a state of high electrostatic potential energy (an unstable state), and therefore the generating capacity drops in comparison with the first configuration example. However, the power generation device 10 of the second configuration example does not require wiring to be connected to the vibrating dielectric body 11, and therefore it is more advantageous than the first configuration example in terms of the ease of device fabrication and the stability of the power generation operation.

(Third Configuration Example)

Figure 11:
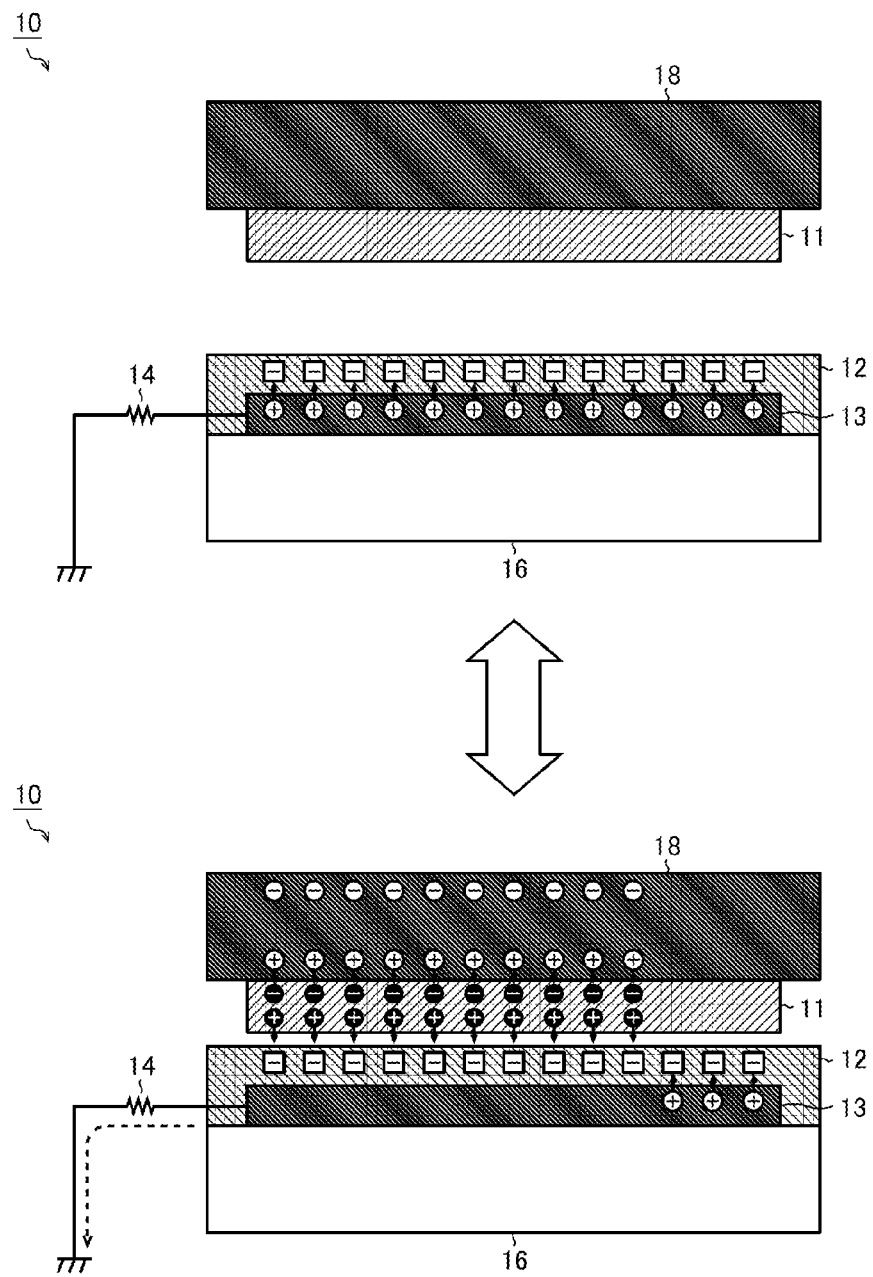
FIG. 11 is a schematic diagram showing a third configuration example of a power generation device.

FIG. 11 is a schematic diagram showing a third configuration example of a power generation device. The power generation device 10 of the third configuration example is substantially analogous in configuration to that of the first configuration example, but has the feature that a metal body 18 in an electrically floating state is formed on the top surface side of the dielectric body 11. The metal body 18 is a member made of metal, and differs from the upper electrode 15 which was intended to be connected to some potential point (grounding terminal), in that it is in an electrically floating state. Consequently, the power generation device 10 of the third configuration example has in common with the preceding second configuration example a configuration whereby the entire moveable section that includes the dielectric body 11 is in an electrically floating state. The metal body 18 may be plate-shaped or film shaped.

In the power generation device 10 of the third configuration example, in a second state in which the dielectric body 11 and the electret 12 are brought close together (at bottom in FIG. 11), negative polarized charges become localized at the top surface of the dielectric body 11 due to internal polarization of the dielectric body 11. Consequently, at the bottom face of the metal body 18 (the interface with the dielectric body 11), intrametallic positive charges are induced through attraction to the aforementioned negative polarized charges.

The power generation device 10 of the third configuration example differs from the previously discussed first configuration example in that, because the metal body 18 is not connected to a grounding terminal, positive charges cannot be attracted to the metal body 18 from the grounding terminal. However, because multiple free electrons (in FIG. 11, depicted as symbols having white circles with minus signs) are present in the metal body 18, these free electrons move away from the interface of the metal body 18 and the dielectric body 11, whereby an effect analogous to that when positive charges are attracted the metal body 18 from the grounding terminal is obtained.

Due to the aforementioned effect, it is possible with the power generation device 10 of the third configuration example to obtain higher generating capacity than with the second configuration example from which the upper electrode 15 has been completely eliminated. In the power generation device 10 of the third configuration example, however, the aforementioned effect is hindered by bias (potential difference) of the charges arising in the interior of the metal body 18. Consequently, in the power generation device 10 of the third configuration example, the generating capacity declines in comparison to the first configuration example in which the upper electrode 15 is connected to a grounding terminal. However, in the same way as the second configuration example discussed previously, in the power generation device 10 of the third configuration example, there is no need to connect wiring to the vibrating dielectric body 11, and it is therefore more advantageous than the first configuration example in terms of the ease of device fabrication and the stability of the power generation operation.

In this way, viewed in relation to generating capacity, the first configuration example is superior to the third configuration example, which is in turn superior to the second configuration. Viewed in terms of the ease of device fabrication and the stability of the power generation operation, the second configuration example is equal to the third configuration example, and these are superior to the first configuration example. Consequently, with regard to the configuration of the power generation device 10, no one configuration can be considered to be always the best, and it is preferable to adopt any of the first to third configurations according to a particular application or required characteristics.

(Packaging)

Figure 12:
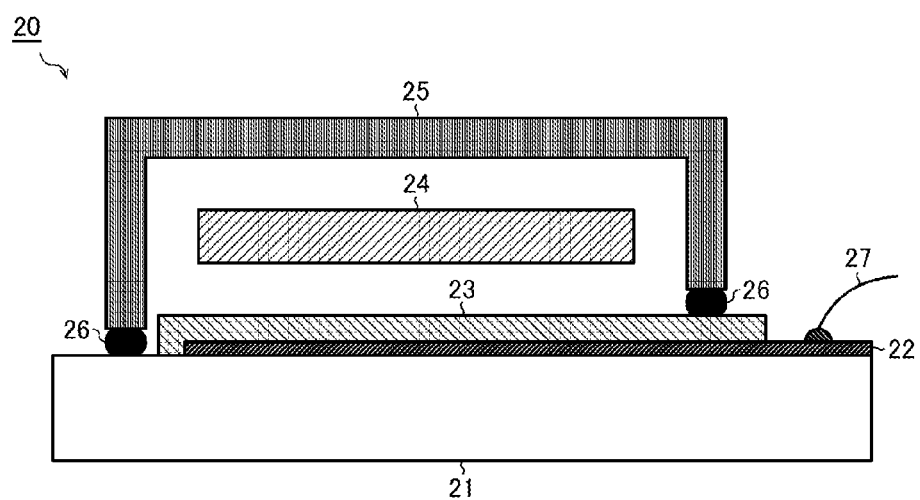
FIG. 12 is a schematic diagram showing a first packaging example of a power generation device.

FIG. 12 is a schematic diagram showing a first packaging example of a power generation device (a cross sectional view taken from a lateral direction). The power generation device 20 of the first packaging example has a substrate 21, a lower electrode 22, an electret 23, a dielectric body 24 (in which a dielectric body, electrodes, and a weight are unified), a package 25, an adhesive 26, and a wire 27. In the description below, it makes no difference whether there is an upper electrode connected to the dielectric body 24.

The lower electrode 22 is formed on the top surface of the substrate 21. The electret 23 is formed so as to cover the lower electrode 22. One terminal of the lower electrode 22 is exposed from the electret 23, extends out to a terminal section of the substrate 21, and is connected to the wire 27 in the terminal section. The wire 27 is connected to a grounding terminal via a resistor, not shown. The package 25 is a cover member (a hollow cylinder, a hollow post, a half sphere, or the like) furnished at one surface with an opening, and the opening is bonded by the adhesive 26 to the substrate 21, with the electret 23 and the dielectric body 24 housed in the interior thereof. The package 25 may be made of a plastic such as a resin or acrylic.

In the power generation device 20 of the first packaging example, the dielectric body 24 is unsupported in any way, but rather is housed displaceably (moveably up and down) along the inner wall of the package 25. When the power generation device 20 is in a stationary state, the dielectric body 24 is close to the electret 23 due to electrostatic attraction (this corresponds to the second state at bottom in FIG. 1). Consequently, by imparting kinetic energy (vibration) from the outside in order to move the dielectric body 24 away from the electret 23, it is possible to convert kinetic energy to electrical energy.

Figure 13:
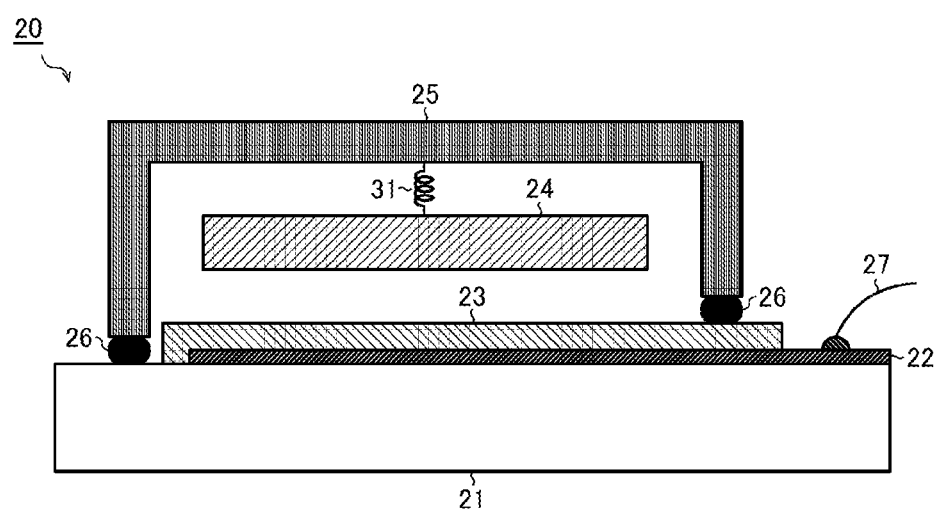
FIG. 13 is a schematic diagram showing a second packaging example of a power generation device.

FIG. 13 is a schematic diagram showing a second packaging example of a power generation device. The configuration of the second packaging example is substantially analogous to that of the first packaging example, but has the feature of having an elastic member 31 that pendently supports the dielectric body 24 in the interior of the package 25. A coil spring or an accordion spring (meander configuration) may be employed as the elastic member 31. By adopting this kind of configuration, the kinetic energy for moving the dielectric body 24 away from the electret 23 can be dragged down, thereby making it possible to perform power generation with smaller vibration. It is also possible to prevent contact of roof surface of the package 25 and the dielectric body 24.

Figure 14:
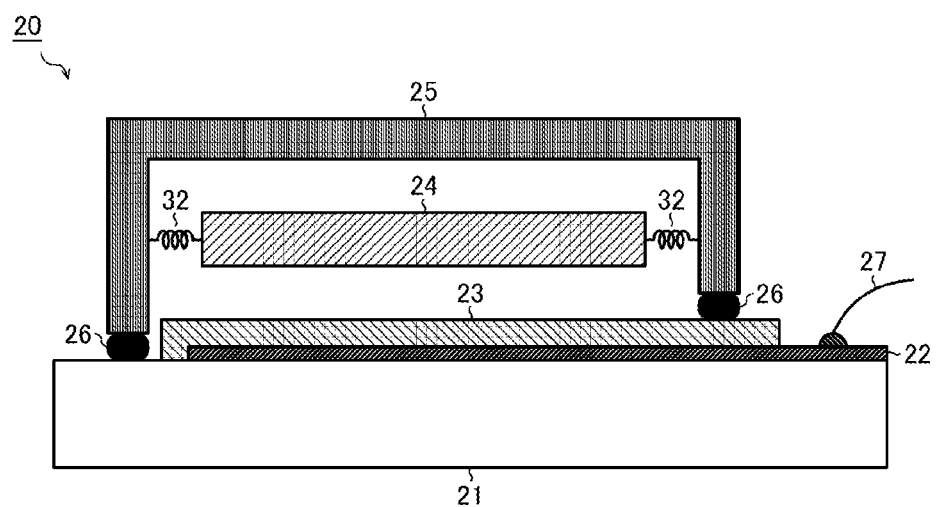
FIG. 14 is a schematic diagram showing a third packaging example of a power generation device.

FIG. 14 is a schematic diagram showing a third packaging example of a power generation device. The configuration of the third packaging example is substantially analogous to that of the first packaging example, but has the feature of having elastic members 32 that support both terminals of the dielectric body 24 in the interior of the package 25. Coil springs or accordion springs (meander configuration) may be employed as the elastic members 32. By adopting this kind of configuration, it is possible to prevent contact of the dielectric body 24 and the inside surfaces of the package 25, without hampering up-and-down motion of the dielectric body 24.

Figure 15:
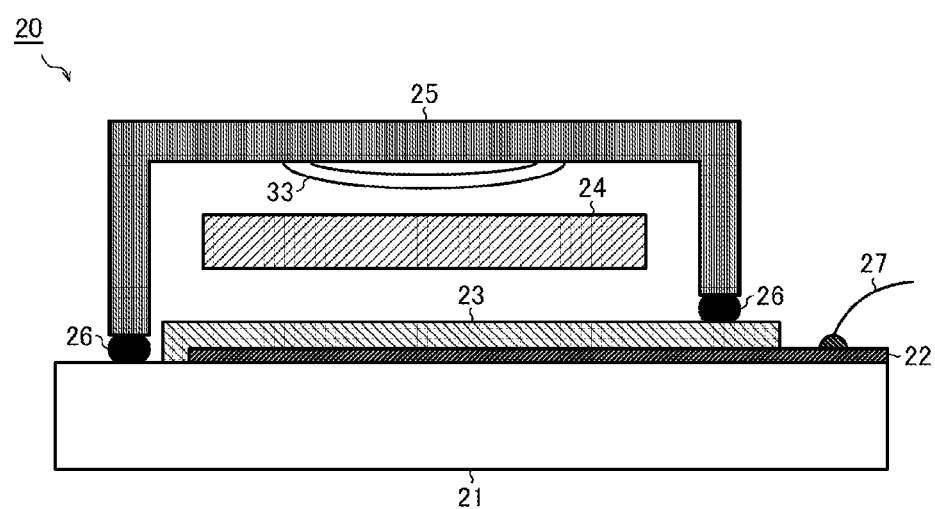
FIG. 15 is a schematic diagram showing a fourth packaging example of a power generation device.

FIG. 15 is a schematic diagram showing a fourth packaging example of a power generation device. The configuration of the fourth packaging example is substantially analogous to that of the first packaging example, but has the feature of having an elastic member 33 whereby the dielectric body 24 is repulsed from the roof surface of the package 25. A plate spring may be used as the elastic member 33. By adopting this kind of configuration, it is possible to prevent contact of the dielectric body 24 and the top surfaces of the package 25, without hampering up-and-down motion of the dielectric body 24.

Figure 16:
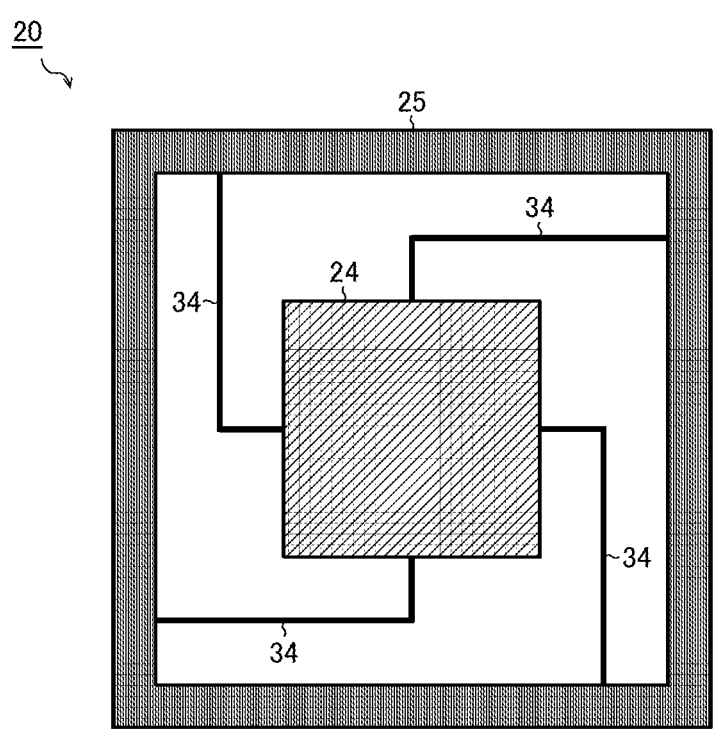
FIG. 16 is a schematic diagram showing a fifth packaging example of a power generation device.

FIG. 16 is a schematic diagram showing a fifth packaging example of a power generation device (a cross sectional view in a direction from the top). The configuration of the fifth packaging example is substantially analogous to that of the first packaging example, but has the feature of having elastic members 34 that support up-and-down motion of the dielectric body 24 while minimizing horizontal movement thereof in the interior of the package 25. In the vibration device 20 of the fifth packaging example, the dielectric body 24 and the package 25 are formed to a cross section of rectangular shape in plan view. As the elastic members 34, it is possible to employ a combination of four plate springs (in a spring arrangement shaped as an equilateral cross with four arms bent at right angles) providing cantilever support of the four side surfaces of the dielectric body 24 from respectively orthogonal support surfaces (inside surfaces of the package 25). By adopting this kind of configuration, it is possible to prevent contact of the dielectric body 24 and the top surfaces of the package 25, without hampering up-and-down motion of the dielectric body 24.

Figure 17:
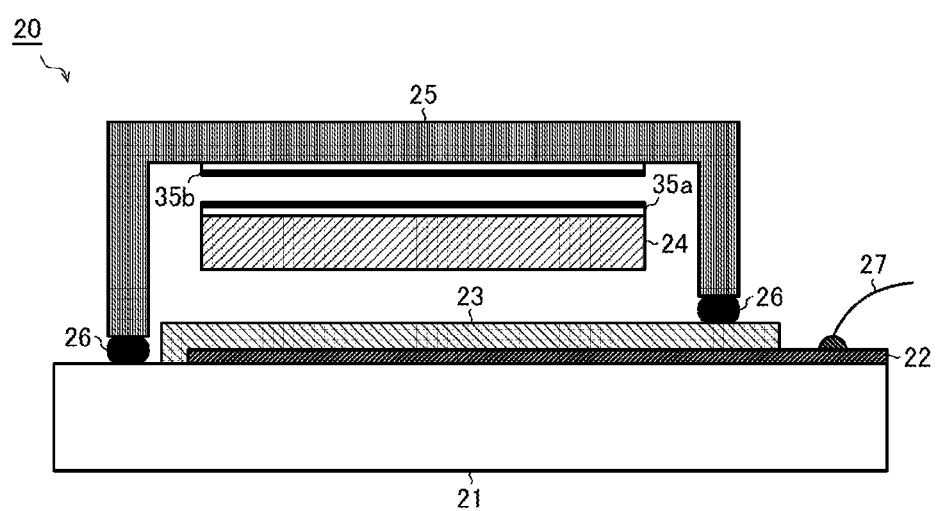
FIG. 17 is a schematic diagram showing a sixth packaging example of a power generation device.

FIG. 17 is a schematic diagram showing a sixth packaging example of a power generation device. The configuration of the sixth packaging example is substantially analogous to that of the first packaging example, but has the feature of having magnets 35a and 35b (a magnetic force spring) for repulsing the dielectric body 24 and the package 25 from one another. By adopting this kind of configuration, it is possible to prevent contact of the dielectric body 24 and the top surfaces of the package 25, without hampering up-and-down motion of the dielectric body 24.

Figure 18:
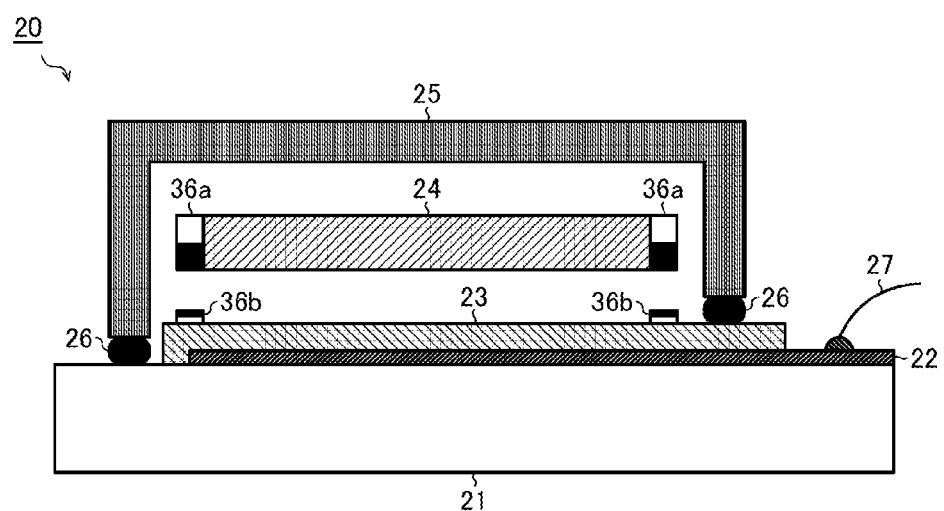
FIG. 18 is a schematic diagram showing a seventh packaging example of a power generation device.

FIG. 18 is a schematic diagram showing a seventh packaging example of a power generation device. The configuration of the seventh packaging example is substantially analogous to that of the first packaging example, but has the feature of having magnets 36a and 36b (a magnetic force spring) for repulsing the dielectric body 24 and the electret 23 from one another. By adopting this kind of configuration, the kinetic energy for moving the dielectric body 24 away from the electret 23 can be dragged down, thereby making it possible to perform power generation with smaller vibration. It is also possible to prevent contact of electret 23 and the dielectric body 24.

Figure 19:
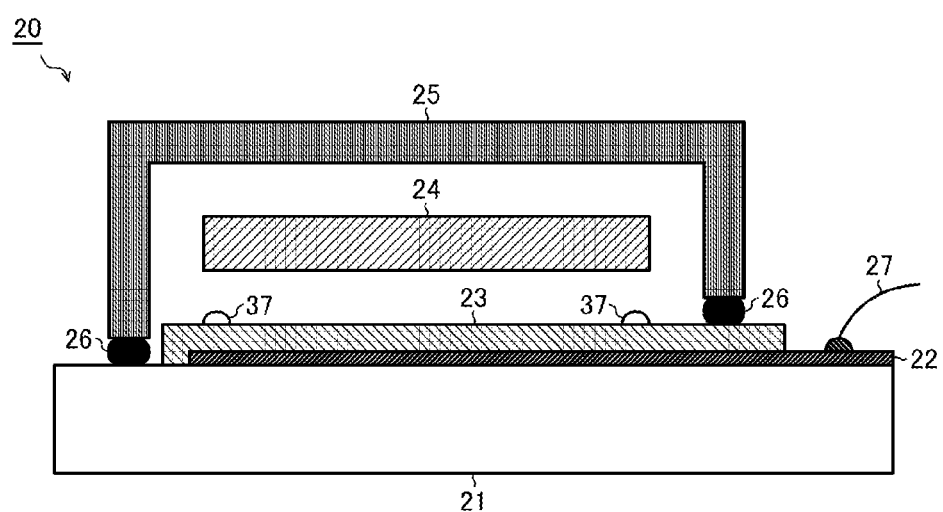
FIG. 19 is a schematic diagram showing an eighth packaging example of a power generation device.

FIG. 19 is a schematic diagram showing an eighth packaging example of a power generation device. The configuration of the eighth packaging example is substantially analogous to that of the first packaging example, but has the feature of having a stopper 37 protruding from the surface of the electret 23. The stopper 37 may be furnished on the surface of the dielectric body 24 as well. By adopting this kind of configuration, the kinetic energy for moving the dielectric body 24 away from the electret 23 can be dragged down, thereby making it possible to perform power generation with smaller vibration. It is also possible to prevent contact of electret 23 and the dielectric body 24.

Any combination of the configurations described individually in the aforementioned first to eighth packaging examples is possible as well. For a configuration furnished with a spring or springs, it is preferable to design the spring constant such that the inherent resonance frequency of the spring matches the frequency of the vibration imparted to the power generation device 20. On the other hand, in a case in which the frequency of the vibration imparted to the power generation device 20 is unstable, it is preferable to adopt a configuration not furnished with a spring, or to employ a soft spring (a spring with a low spring constant).

(Dielectric Body Guide Configuration)

Figure 20:
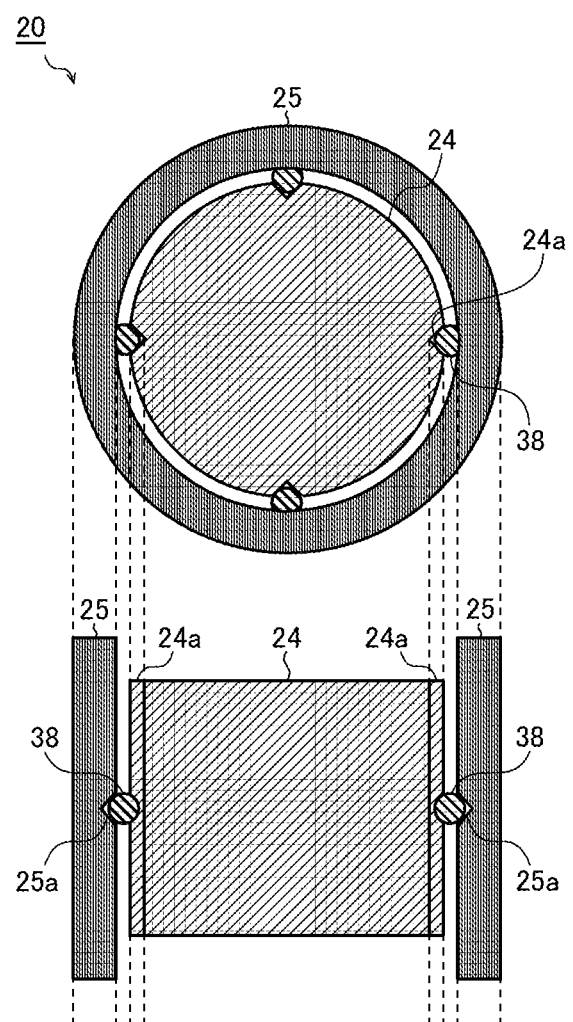
FIG. 20 is a schematic diagram showing a first guide example of a dielectric body.

FIG. 20 is a schematic diagram showing a first guide example of a dielectric body (a top view, and a cross sectional view from a lateral direction). In the power generation device 20 of the first guide example, the dielectric body 24 and the package 25 are formed such that their respective outside edges and inside edges are circular, when the power generation device 20 is seen in plan view. The dielectric body 24 is housed in an arrangement in which ball members 38 (steel spheres) are wedged between it and the inner wall of the package 25. The ball members 38 are respectively furnished at four equidistant positions along the outer rim of the dielectric body 24 (the inner rim of the package 25) when the power generation device 20 is seen in plan view. Rail slots 24*a* are respectively formed in the up-and-down direction in the dielectric body 24, at the positions of abutment with the ball members 38. Meanwhile, recessed sphere-receiving sections 25*a* are respectively formed on the inner wall of the package 25, at the positions of abutment with the ball members 38. By adopting this kind of configuration, it is possible to prevent contact of the dielectric body 24 and the inside surfaces of the package 25, without hampering up-and-down motion of the dielectric body 24.

Figure 21:
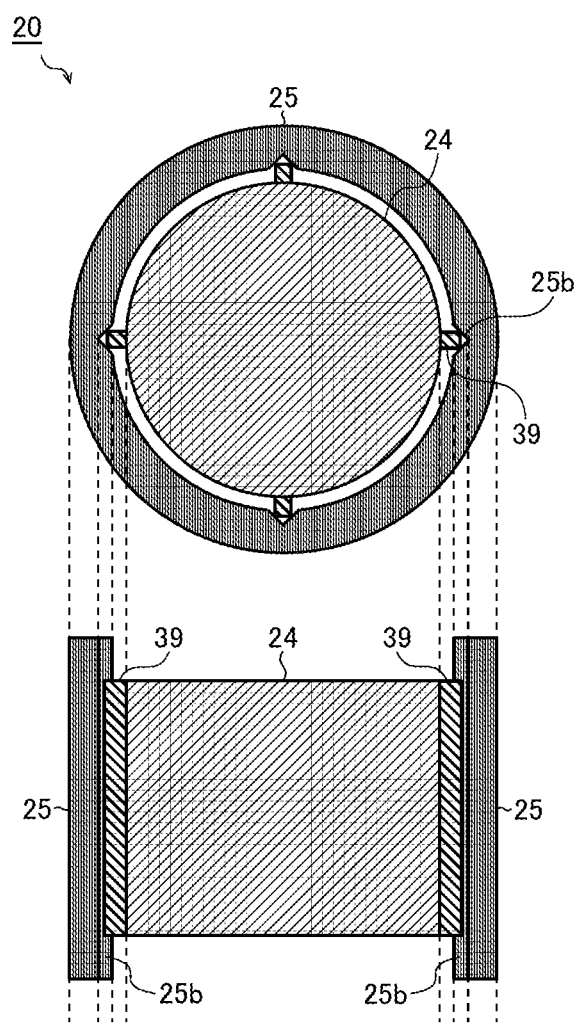
FIG. 21 is a schematic diagram showing a second guide example of a dielectric body.

FIG. 21 is a schematic diagram showing a second guide example of a dielectric body (a top view, and a cross sectional view from a lateral direction). The power generation device 20 of the second guide example is analogous to the first guide example in that the dielectric body 24 and the package 25 are formed such that their respective outside edges and inside edges are circular, when the power generation device 20 is seen in plan view. The dielectric body 24 is housed by an arrangement in which rail members 39 abut the inner wall of the package 25. The rail members 39 are respectively furnished at four equidistant positions along the outer rim of the dielectric body 24 (the inner rim of the package 25) when the power generation device 20 is seen in plan view. Rail slots 25*b* are respectively formed in the up-and-down direction on the wall of the package 25, at the positions of abutment with the rail members 39. By adopting this kind of configuration, it is possible to prevent contact of the dielectric body 24 and the inside surfaces of the package 25, without hampering up-and-down motion of the dielectric body 24. The rail members 39 may be integrally formed by machining of the dielectric body 24, or formed separately from a material different from the dielectric body 24 and having good slide properties (a fluoroplastic or the like).

(Ground Ring)

Figure 22:
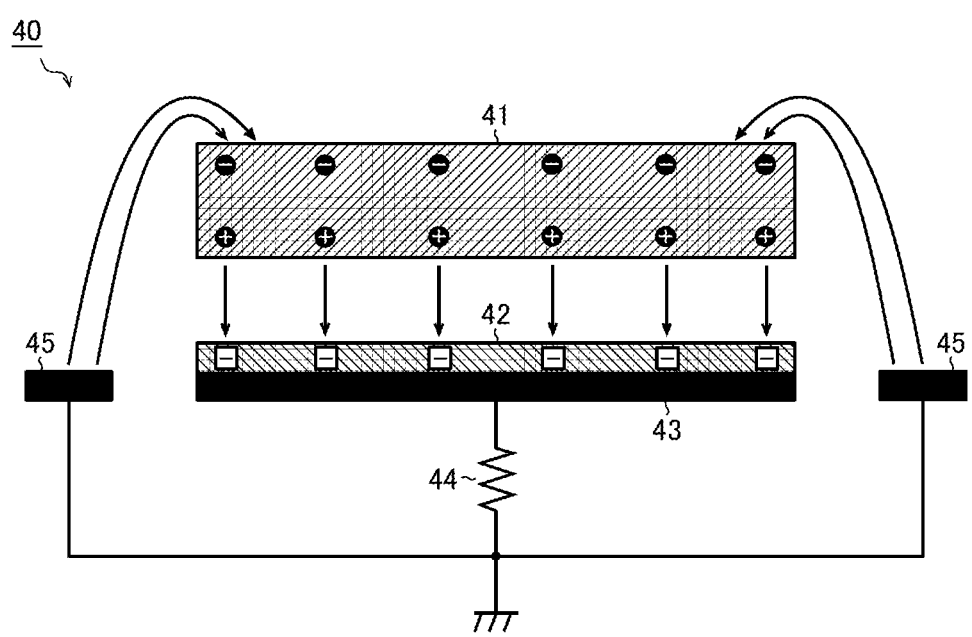
FIG. 22 is a schematic diagram showing a first implementation example of a ground ring.

Next, a ground ring that may be of service when a configuration not furnished with an electrode on the dielectric body side (see the second configuration example of FIG. 10) is adopted will be described. FIG. 22 is a schematic diagram showing a first implementation example of a ground ring (a cross sectional view from a lateral direction). The arrows in the drawing show lines of electric force. The power generation device 40 of the first implementation example has a dielectric body 41, an electret 42, a lower electrode 43, a resistor 44, and a ground ring 45. The ground ring 45 is a conductive member (for example, aluminum) formed so as to encircle the perimeter of the electret 42 and the lower electrode 43, at a predetermined distance away therefrom. The ground ring 45 is directly connected to a grounding terminal.

In the power generation device 40, as the dielectric body 41 and the electret 42 are brought closer together, negative polarized charges become localized on the top surface of the dielectric body 41 due to internal polarization of the dielectric body 41. According to the power generation device 40 of the first implementation example, lines of electric force can escape from the negative charges of the dielectric body 41 towards the positive charges of the ground ring 45, and therefore it is possible to minimize repulsion between the negative charges of the dielectric body 41 and the negative charges of the electret 42, and hence it is possible to increase generation efficiency.

Figure 23:
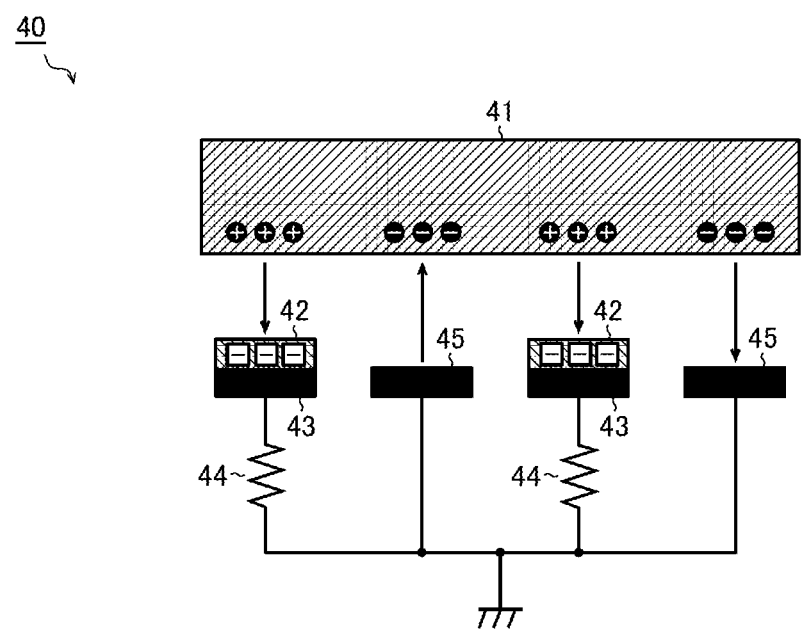
FIG. 23 is a schematic diagram showing a second implementation example of a ground ring.

FIG. 23 is a schematic diagram showing a second implementation example of a ground ring (a cross sectional view from a lateral direction). The arrows in FIG. 23 show lines of electric force. As shown in the drawing, it is not essential for the ground ring 45 to be formed so as to encircle the perimeter of the electret 42 and the lower electrode 43; the ground ring 45 and the electret 42 may instead be disposed alternately in mutually adjacent fashion. According to this sort of configuration, when polarization in a horizontal direction arises in the interior of the dielectric body 41, lines of electric force can escape from the negative charges of the dielectric body 41 towards the positive charges of the ground ring 45, and therefore it is possible to minimize repulsion between the negative charges of the dielectric body 45 and the negative charges of the electret 42, and hence it is possible to increase generation efficiency.

(Shape of Dielectric Body and Lower Electrode)

Figure 24:
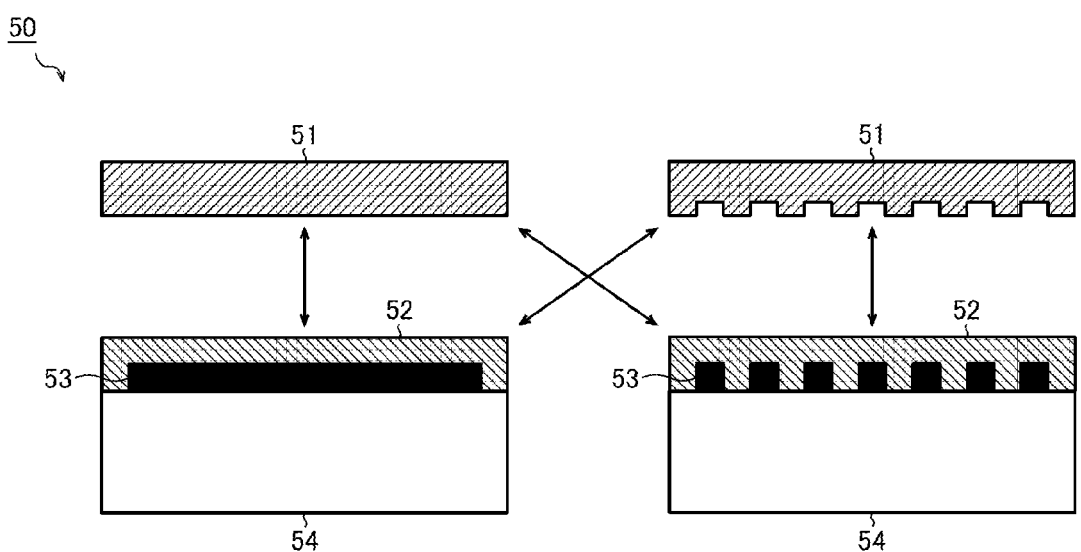
FIG. 24 is a schematic diagram showing an example of a combination of dielectric body shape and lower electrode shape.

FIG. 24 is a schematic diagram showing an example of a combination of dielectric body shape and lower electrode shape. The power generation device 50 of the present example has a dielectric body 51, an electret 52, a lower electrode 53, and a substrate 54.

The dielectric body 51 may have a configuration in which the bottom surface that faces the electret 52 has been planarized (see the left side in FIG. 24), or a configuration in which the bottom surface has been patterned (see the right side in FIG. 24). With the former configuration, the gap distance of the dielectric body 51 and the electret 52 can be made uniform. With the latter configuration, lines of electric force easily concentrate at sites that have been sharpened through patterning, and improved generation efficiency through optimization of patterning can be anticipated.

Figure 25:
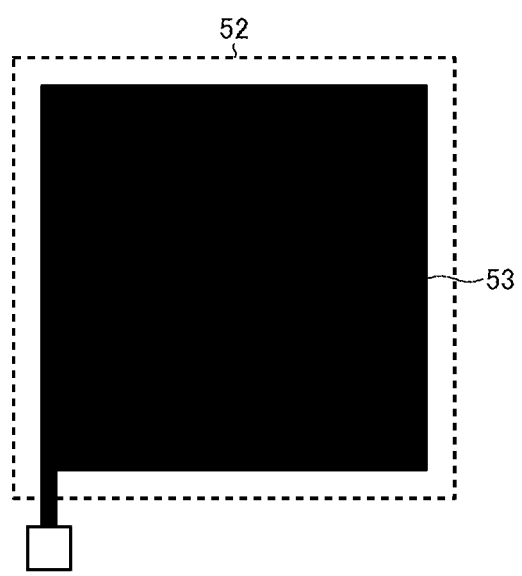
FIG. 25 is a schematic diagram showing a first example of lower electrode shape.
Figure 26:
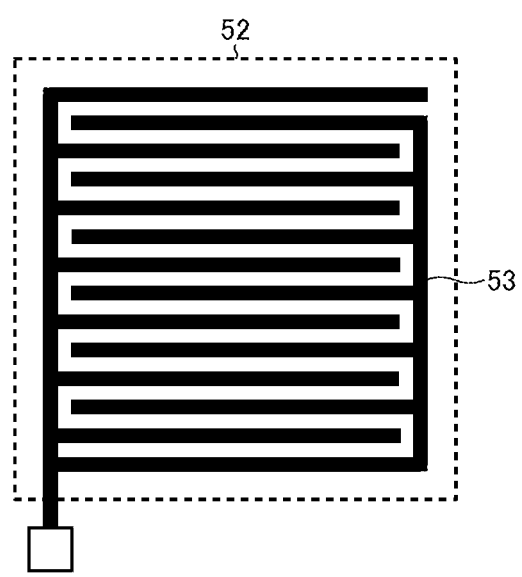
FIG. 26 is a schematic diagram showing a second example of lower electrode shape.
Figure 27:
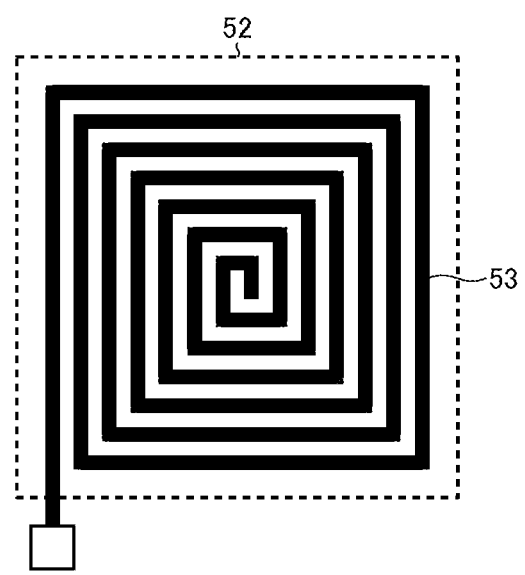
FIG. 27 is a schematic diagram showing a third example of lower electrode shape.

The lower electrode 53 may be formed to a planar shape, without patterning being performed (FIG. 25); or patterning may be carried out to form a pectinate shape (FIG. 26) or spiral shape (FIG. 27). However, from the standpoint of generation efficiency, it is preferable to adopt the former configuration.

The combination of the shape of the dielectric body 51 (patterned or non-patterned) and the shape of the lower electrode (patterned or non-patterned) is arbitrary.

(Triaxial Capability)

Figure 28:
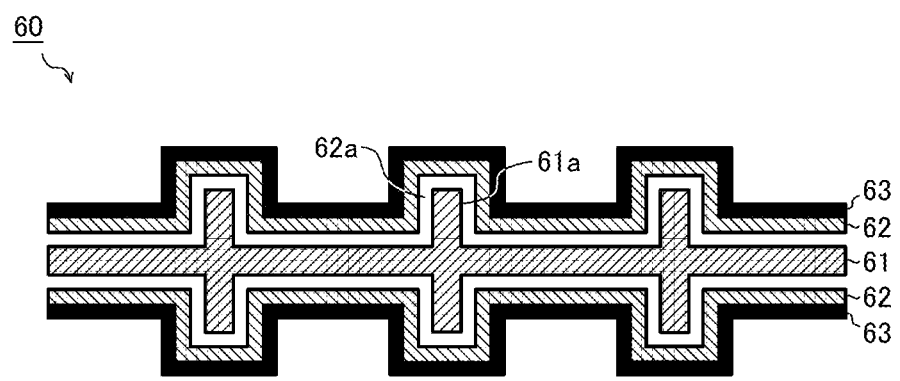
FIG. 28 is a schematic diagram showing a first structure for realizing triaxial capability.

FIG. 28 is a schematic diagram showing a first structure for realizing triaxial capability. The power generation device 60 of the first structure has a dielectric body 61, electrets 62, and a lower electrode 63. A plurality of protruding portions 61*a* are formed on the dielectric body 61, and a plurality of recessed portions 62*a* adapted to mate with the protruding portions 61*a* are formed at predetermined intervals on the electrets 62. While not depicted in FIG. 28, the power generation device 60 has an analogous structure in the depthwise direction of the page as well. By adopting such a structure, the gap distance of the dielectric body 61 and the electrets 62 may be made to vary in cases in which the dielectric body 61 vibrates in the up-and-down direction of the page, in cases in which the dielectric body 61 vibrates in the left-and-right direction of the page, and in cases in which the dielectric body 61 vibrates in the depthwise direction of the page, whereby it becomes possible to generate power efficiently.

In the power generation device 60 of the first structure, the electrets 62 are respectively disposed to either side of the dielectric body 61. Through such a configuration, it is possible to further increase generation efficiency. While not depicted in FIG. 28, through a configuration in which the dielectric bodies 61 are stacked in multiple layers with the electrets 62 disposed to either side of each, further improvement in generation efficiency can be anticipated. It is of course possible to implement such a multilayer structure in the basic structure discussed previously (in FIG. 1, etc.), that lacks the protruding portions 61*a* and the recessed portions 62*a*.

Figure 29:
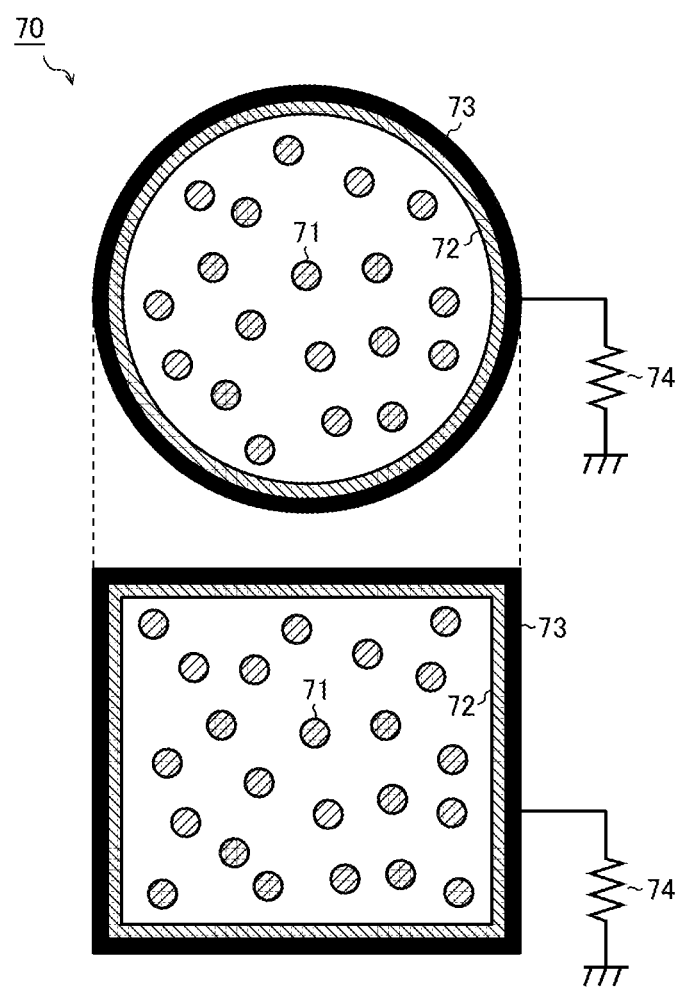
FIG. 29 is a schematic diagram showing a second structure for realizing triaxial capability.

FIG. 29 is a schematic diagram showing a second structure for realizing triaxial capability. In the power generation device 70 of the second structure, an electret 72 is formed on the inner wall of a hermetic container, and particles of a dielectric body 71 are sealed inside the hermetic container. A lower electrode 73 is formed so as to encircle the outside peripheral side of the electret 72, and is connected to a grounding terminal via a resistor 74. By adopting such a structure, in cases in which vibration in any direction is imparted to the power generation device 70, the gap distance of the dielectric body 71 and the electret 72 will vary, and it is therefore possible to generate power efficiently.

Figure 30:
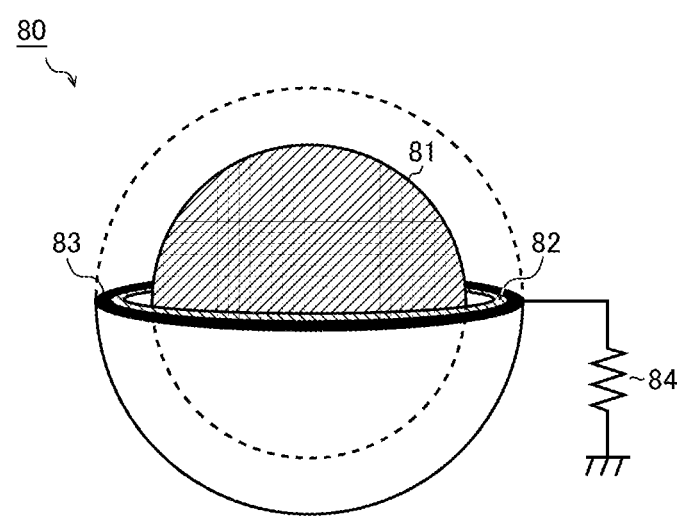
FIG. 30 is a schematic diagram showing a third structure for realizing triaxial capability.

FIG. 30 is a schematic diagram showing a third structure for realizing triaxial capability. In the power generation device 80 of the third structure, an electret 82 is formed on the inner wall of a hermetic spherical body, and a spherical dielectric body 81 is sealed inside the hermetic spherical body. A lower electrode 83 is formed so as to encircle the outside peripheral side of the electret 82, and is connected to a grounding terminal via a resistor 84. By adopting such a structure, in cases in which vibration in any direction is imparted to the power generation device 80, the gap distance of the dielectric body 81 and the electret 82 will vary, and it is therefore possible to generate power efficiently.

Figure 31:
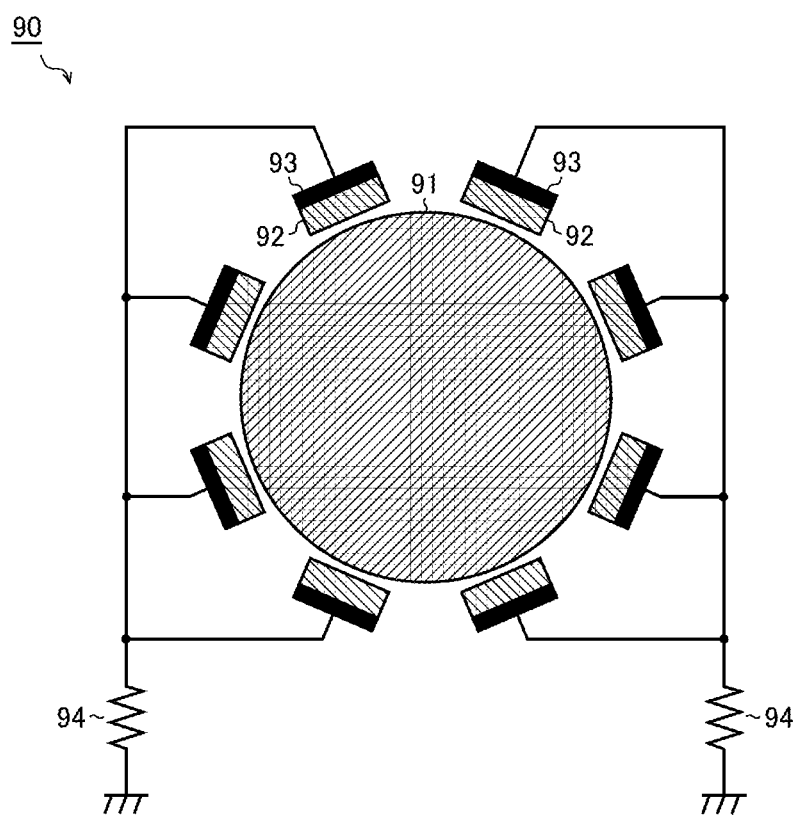
FIG. 31 is a schematic diagram showing a fourth structure for realizing triaxial capability.

FIG. 31 is a schematic diagram showing a fourth structure for realizing triaxial capability. In the power generation device 90 of the fourth structure, a dielectric body 91 is given a spherical shape, and a plurality of electrets 92 are formed so as to encircle the dielectric body 91. A lower electrode 93 is formed on each of the plurality of electrets 92, and is connected to a grounding terminal via a resistor 84. By adopting such a structure, in cases in which vibration in any direction is imparted to the power generation device 90, the gap distance of the dielectric body 91 and the electret 92 will vary, and it is therefore possible to generate power efficiently.

(Relative Permittivity and Generating Capacity of Dielectric Body)

Figure 32:
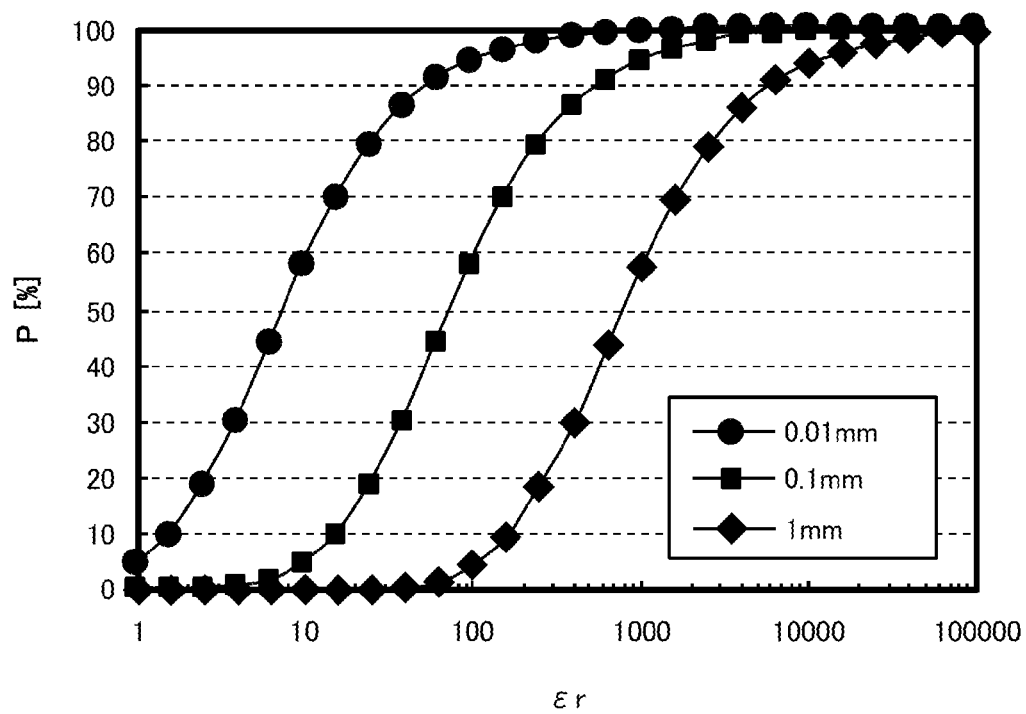
FIG. 32 is a graph showing the relationship between generating capacity and relative permittivity of a dielectric body.

FIG. 32 is a graph showing the relationship between generating capacity and relative permittivity of a dielectric body. The horizontal axis of FIG. 32 shows the relative permittivity $\varepsilon r$ of a dielectric body, and the vertical axis of FIG. 32 shows the generating capacity P (%) (normalized using the generating capacity in a case in which the relative permittivity $\varepsilon r$ is infinite). The present graph shows computation results obtained by the previously cited Equations (3) to (9), under hypothetical conditions of an electret relative permittivity of 2, an electret film thickness of 5 μm, a dielectric body vibration amplitude of 20 μm, and a gap layer (an air layer) thickness (gap distance) of 1 μm, when the dielectric body and the electret are closest. However, the generated power outputs in the drawing have been normalized using a generating capacity of 100% in a case in which the relative permittivity $\varepsilon r$ of the dielectric body is infinite. The circle symbols, square symbols, and diamond symbols in FIG. 32 respectively show computation results when the thickness of the dielectric body was 0.01 mm, 0.1 mm, and 1 mm.

As will be appreciated from FIG. 32, the computation results vary according to the thickness of the dielectric body. When the thickness of the dielectric body is 0.01 mm, maximum generating capacity of 90% is obtained when the relative permittivity $\varepsilon r$ is approximately 30. On the other hand, when the thickness of the dielectric body is 1 mm, relative permittivity $\varepsilon r$ of approximately 3,000 is necessary to obtain maximum generating capacity of 90%. Consequently, in order to increase the generating capacity, it is preferable for the dielectric body to be as thin as possible.

However, when the dielectric body is too thin, there is a risk that charges within the electret will be discharged upon contact with the electret. Consequently, from the standpoint of both increasing the generating capacity and preventing discharge, it would conceivably be appropriate to use a dielectric body having thickness of 0.1 mm and relative permittivity Er of 300 or above, for example. However, the values for thickness and relative permittivity given here are merely one example, and other values are acceptable. Considered from an overall standpoint of charge retention characteristics, generating capacity, device size, production costs, and the like, as a design range for practical purposes, the dielectric body may suitably employ a material having a thickness of 0.01 to 1.0 mm (preferably 0.01 to 0.1 mm), and from which maximum generating capacity of 80% or more can be obtained.

As the method for fabricating the dielectric body, it is possible to adopt any of various methods, depending on the thickness of the dielectric body. For example, dielectric bodies of a thickness of one micron or less to several microns can be fabricated by a sputtering process or electron beam deposition process. Dielectric bodies of a thickness of one micron or less to several tens of microns can be fabricated by a hydrothermal synthesis process including a sol-gel process, accompanied by spin coating and firing. Dielectric bodies of a thickness of several tens of microns or more can be fabricated by firing of a powder, pressure molding or another molding process, and thickness adjustment by slicing, cutting, polishing, or the like.

(Material of Dielectric Body)

The most desirable material is barium titanate ($BaTiO_3$, BTO). The relative permittivity at service temperatures (expected to be 0 to 100° C.) is approximately 1,000, which meets the aforementioned condition. The material is relatively cheap, and has minimal environmental impact by virtue of being lead-free, and is therefore advantageous for commercial purposes as well. In environments of 120° C. and above, the relative permittivity drops. Moreover, the relative permittivity drops in cases in which the operating frequency is 100 kHz or above. However, as the expected operating frequency is from 1 to several hundred Hz, the aforementioned characteristics are not a drawback for the present device. The only problem is that, by virtue of being a ferroelectric body, there is hysteresis in the dielectric characteristics.

The next most desirable material is lead zirconate titanate (PZT). Because of the extremely high relative permittivity (2,000 to 3,000), the material is effective in cases in which it is desired to make the generating capacity as great as possible. However, drawbacks are relatively high cost, and high environmental impact by virtue of containing lead. Moreover, like barium titanate, it is a ferroelectric body, and it is necessary to be aware of hysteresis in the characteristics.

Further, it is desirable to add to alkaline earth metals such as potassium (K), calcium (Ca), strontium (Sr) or the like, or rare earth metals such as yttrium (Yt), neodymium (Nd), or the like, to barium titanate. Typically, the addition of these produces a drop in the relative permittivity of barium titanate, and effects such as the following may be anticipated.

A first effect is to depress the Curie temperature. A ferroelectric body has a unique temperature, known as the Curie temperature, in proximity to which temperature the maximum permittivity is observed. Consequently, by setting the Curie temperature of a dielectric body to closely approximate the service temperature of the power generation device, the permittivity at operating temperature can be increased to a level greater than that of pure barium titanate. However, permittivity varies considerably with temperature variations, and destabilized generation efficiency is a drawback.

A second effect is that as the added amount is increased, the nature of the material varies from a ferroelectric body to a paraelectric body. A paraelectric body exhibits minimal variation of permittivity due to temperature variations, and lacks hysteresis, and therefore stable power generation can be anticipated. Due to permittivity that is high among paraelectric bodies, a modicum of generating capacity can be assured.

Next, strontium titanate may be cited. Strontium titanate is the result of substituting strontium for barium in barium titanate. The material is a ferroelectric body, with permittivity of approximately 300, and has the advantage of meeting the aforementioned condition. However, the permittivity is low in comparison with barium titanate. Another drawback is that strontium is a rare metal, and is costly.

Next, as examples of lead-free piezoelectric high-k dielectric bodies, there may be cited lanthanum iron oxide ($LaFeO_3$), potassium niobate ($KNbO_3$), lanthanum titanate ($LaTiO_3$), magnesium silicate ($MgSiO_3$), and barium titanate zirconate ($Ba(Ti, Zr)O_3$).

A characteristic of lanthanum iron oxide ($LaFeO_3$) is that the relative permittivity of a monocrystal layer is 1,000 or above, with the relative permittivity reaching several tens of thousands or more at high temperatures. The addition of a trace amount of lanthanum iron oxide ($LaFeO_3$) to potassium niobate ($KNbO_3$) has the effect of pulling up the permittivity. For example, addition of 0.2% lanthanum iron oxide ($LaFeO_3$) boosts the relative permittivity of potassium niobate ($KNbO_3$) at room temperature from 500 to 1,250.

The crystalline structure of potassium niobate ($KNbO_3$) is a perovskite structure. At $-10°$ C. or below it is rhombohedral, but at normal temperature it becomes orthorhombic, at 225 to 435° C. it becomes tetragonal, and at 435° C. (the Curie temperature) and above it becomes cubic. As advantages of this there may be cited: (1) the material is a ferroelectric body and shows high piezoelectricity; (2) the material is a ferroelectric body having a bismuth layer structure, as well as being a lead-free piezoelectric ceramic; (3) the material is easily polarized (polarization at 5 to 6 kV/mm or less at 150° C. is possible); (4) the material has relative permittivity (800 to 1,000) comparable to that of lead zirconate titanate (PZT); and (5) the material has a relatively flat relative permittivity curve from room temperature up to about 200° C. Conversely, as drawbacks there may be cited: (1) difficulty in sintering, by virtue of being a ceramic; (2) remaining unreacted potassium oxide adversely affects moisture resistance due to its deliquescent nature; and (3) the principal component niobium is a rare metal, and is costly.

The Curie temperature of barium titanate zirconate ($Ba(Ti, Zr)O_3$) can be brought to below 120° C. Where Ti:Zr=8:2, the Curie temperature is 40° C., and relative permittivity is 4,000.

Next, as polymer-based ferroelectric bodies, there may be cited polylactic acid and polyureic acid. Polymer-based ferroelectric bodies are pliable and have relatively high permittivity, and therefore applications such as protective films for contact surfaces and the like may be anticipated. The relative permittivity of polylactic acid is approximately 22. Polyureic acid is an organic piezoelectric material with relative permittivity of 3.6 to 11.8.

Next, relaxor ferroelectric bodies may be cited. As characteristics common to relaxor ferroelectric bodies, there may be cited: (1) large piezoelectric effects; (2) extremely large permittivity and low temperature variation thereof; (3) anomalously large relative permittivity reaching into the several tens of thousands; (4) having a broad permittivity peak and frequency distribution; and (5) having spontaneous polarization characteristics that show slow variation up to high temperatures.

Most relaxor ferroelectric bodies have a compound structure of the complex perovskite type ($A(B',B'')O_3$) in which divalent ions are present at the A sites, and two different types of ions having on average tetravalent charge are present at the B sites. These may be broadly classified into a type containing ions of +2 valence and +5 valence in a 1:2 ratio ($A(B'_{1/3}B''_{2/3})O_3$), and types containing ions of +3 valence and +5 valence or ions of +2 valence and +6 valence in a 1:1 ratio ($A(B'_{1/2}B''_{1/2})O_3$). Most relaxor ferroelectric bodies form mixed crystals with the ferroelectric body $PbTiO_3$, and give rise to interesting phenomena.

As examples of relaxor ferroelectric bodies there may be cited $(1-x)Pb(Mg_{1/3}Nb_{2/3})O_3 \cdot xPbTiO_3$, $(1-x)Pb(Zn_{1/3}Nb_{2/3})O_3 \cdot xPbTiO_3$, and $(1-x)Pb(In_{1/2}Nb_{1/2})O_3 \cdot xPbTiO_3$.

As characteristics of solid solutions (PZN/xPT) of Pb ($Zn_{1/3}Nb_{2/3})O_3$ and $PbTiO_3$ there may be cited: (1) they are ferroelectric bodies and piezoelectric bodies; and (2) in the case of PZN/9PT, the piezoelectric constant d33 is approximately 2,500 pC/N. The compositional ratio of PZN and PT is in a range termed the morphotropic phase boundary (commonly known as the MPB) that exactly divides trigonal from tetragonal, and various experimental techniques are being employed to search for the cause of the high piezoelectric effect, from the standpoint of the drop in symmetry observed at the MPB.

As a characteristic of (Ba, La) (Ti, Cr)$O_3$, it may be cited that the material is a lead-free relaxor ferroelectric body. The correct composition is $(Ba_{1-x}La_x)(Ti_{1-x}Cr_x)O_3$ (where $0 \leq x < 1$). When x=0.035, relative permittivity is 2,000, and stable permittivity is shown at close to room temperature.

(Applications)

By implementing the aforementioned power generation devices as a power supply for sensors of various kinds or wireless devices (for example, ZigBee 300 MHz band-specific low-power wireless devices), there can be built a ubiquitous environment of wireless sensors and a wireless sensor network. Specifically, because the need for power supply wiring for the various sensors and the wireless devices is obviated, it is possible for individual devices to be disposed in dispersed fashion, and to realize information linkages within the network.

Besides application in tire pressure monitoring systems (TPMS), some of which are already in use, as service scenarios for ubiquitous environments employing the aforementioned power generation devices, there may be cited, for example, the medical and health fields (health management and safety confirmation), monitoring of structures (monitoring for wire disconnects or loose bolts), monitoring plants (monitoring for equipment faults), and logistics management (monitoring logistics and product quality). Moreover, because motors and other such electrical machinery vibrate at the power supply frequency (50 Hz or 60 Hz), where the resonance condition of a spring system incorporated into a power generation device is matched to the aforementioned power supply frequency, even larger generating capacity can be anticipated, and therefore use of the generated power output as a power supply of a data processing device or the like is conceivable. Further, applications in which the aforementioned power generation devices are attached to the body to generate power, or applications in which the aforementioned power generation devices are installed in a mobile device such as a mobile telephone, may be envisioned as well.

EFFECT OF THE INVENTION

According to the present invention, power is generated from Z-axis component vibration of a vibrator, thereby obviating the need for fine patterning of the electret and the electrodes; and because the dielectric body and the electret do not discharge even if in contact, there is no need to avoid contact of the dielectric body and the electret as well, whereby it is possible to offer a compact, high-output power generation device, and hence possible to relieve the user of any concern about battery life.

INDUSTRIAL APPLICABILITY

The power generation device according to the present invention is a technique suitably applicable as a power supply employed by various types of sensors and wireless devices (wireless sensor networks, health monitoring, and the like).

Additional Alternative Examples

The configuration of the present invention is not limited to the aforementioned embodiments and alternative examples, and various additional modifications are possible without departing from the spirit of the invention. Specifically, the aforementioned embodiments are in all respects merely exemplary, and should not be construed as limiting, the technical scope of the present invention being shown by the scope of the claims rather than the description of the aforementioned embodiments, and being understood to include all modifications equivalent in meaning to and falling within the scope of the claims.

LIST OF REFERENCE NUMERALS

10 Power generation device
11 Dielectric body
12 Electret
13 Lower electrode
14 Resistor
15 Upper electrode
16 Substrate
17 Gap layer
18 Metal body
20 Power generation device
21 Substrate
22 Lower electrode
23 Electret
24 Dielectric body (unified dielectric body, electrodes, and weight)
24a Rail slots
25 Package
25a Sphere-receiving sections
25b Rail slots
26 Adhesive
27 Wire
31-34 Elastic members
35a, 35b, 36a, 36b Magnets
37 Stopper
38 Ball member
39 Rail member
40 Power generation device
41 Dielectric body
42 Electret
43 Lower electrode
44 Resistor
45 Ground ring
50 Power generation device
51 Dielectric body
52 Electret
43 Lower electrode
54 Substrate
60 Power generation device
61 Dielectric body
61a Protruding portions
62 Electret
62a Recessed portions
63 Lower electrode
70, 80, 90 Power generation device
71, 81, 91 Dielectric body
72, 72, 92 Electret
73, 83, 93 Lower electrode
74, 84, 94 Resistor
X1 Dielectric body
X2 Aluminum plate
X3 Electromagnetic type vibration exciter
X4 Test sample
X41 Electret
X42 Lower electrode
X43 Substrate
X5 Aluminum plate
X6 Three-axis stage
X7 Base
X8 Coaxial cable
X9 Coaxial cable
X10 Shield case
X10a First connector
X10b Second connector
X11 Coaxial cable
X12 Low-pass filter
X13 Coaxial cable
X14 Oscilloscope
Rv, R Load resistance
Y Corona discharge device
Y1 Grid
Y2 Discharge electrode needle
Y3 Grid power supply
Y4 DC high voltage power supply

What is claimed is:

1. A power generation device comprising:
a dielectric body; and
an electret;
wherein a gap distance presents between the dielectric body and the electret, and the gap distance varies due to displacement of the dielectric body toward the electret in association with vibration, whereby the power generation device generates power,
a first electrode is connected to the electret on a side not facing the dielectric body,
the first electrode is connected to a grounding terminal via a load,
a second electrode is connected to the dielectric body on a side not facing the electret,
the second electrode is directly connected to the grounding terminal, and
the load is arranged to draw, in a form of a voltage, electrical current flowing between the first electrode and the grounding terminal due to vibration of the power generation device,
wherein the electret and the dielectric body face each other, each in an exposed state.

2. The power generation device of claim 1, the electret being formed so as to cover the entire surface of the first electrode.

3. The power generation device of claim 1, a gap layer held between the dielectric body and the electret being filled with a predetermined gas.

4. The power generation device of claim 3, the predetermined gas being air, an inert gas, or a gas having a discharge-preventive effect.

5. The power generation device of claim 4, the principal component of the gas having a discharge-preventive effect being $SF_6$.

6. The power generation device of claim 1, further comprising:
a package for housing the dielectric body and the electret.

7. The power generation device of claim 6, the dielectric body being housed displaceably along an inner wall of the package.

8. The power generation device of claim 7,
the dielectric body being accommodated in a configuration where a ball member is wedged in a region bounded on one side by the inner wall of the package.

9. The power generation device of claim 7,
the dielectric body being accommodated in a configuration where a rail member is caused to abut the inner wall of the package.

10. The power generation device of claim 1, the surface of the dielectric body facing the electret being planarized.

11. The power generation device of claim 1, the surface of the dielectric body facing the electret being patterned.

12. The power generation device of claim 1, the first electrode being formed to a planar shape, without patterning being performed.

13. The power generation device of claim 1, a plurality of protruding portions being formed on the dielectric body, and a plurality of recessed portions adapted to mate with the protruding portions being formed at predetermined intervals on the electret.

14. The power generation device of claim 1, the electrets being disposed on both sides of the dielectric body.

15. The power generation device of claim 14, the dielectric bodies being stacked in multiple layers, and the electrets being disposed to either side of the dielectric bodies.

16. The power generation device of claim 1, the thickness of the dielectric body being 0.01 to 1.0 mm and the generating capacity thereof being 80% or above upon normalization performed using a generating capacity of 100% in a case where the relative permittivity of the dielectric body is infinite.

17. The power generation device of claim 1, the thickness of the dielectric body being 0.01 to 0.1 mm.

18. The power generation device of claim 1,
the dielectric body being formed employing any of barium titanate;
lead zirconate titanate;
barium titanate to which an alkaline earth metal or rare earth metal has been added;
strontium titanate;
lanthanum iron oxide;
potassium niobate;
potassium niobate to which lanthanum iron oxide has been added;
lanthanum titanate;
magnesium silicate;
barium titanate zirconate;
a polymer-based ferroelectric body; and
a relaxor ferroelectric body.

19. The power generation device of claim 1 wherein, as the power generation device vibrates, the dielectric body is displaced toward the electret with no deformation or distortion in the dielectric body itself.

20. A power generation device comprising:
a dielectric body;
an electret; and
a package for housing the dielectric body and the electret
wherein
a distance between the dielectric body and the electret is varied, whereby the power generation device generates power,
a first electrode is connected to the electret on a side not facing the dielectric body,
the first electrode is connected to a grounding terminal via a load,
a second electrode is connected to the dielectric body on a side not facing the electret,
the second electrode is directly connected to the grounding terminal,
the load is arranged to draw, in a form of a voltage, electrical current flowing between the first electrode and the grounding terminal due to vibration of the power generation device, and
the dielectric body is housed displaceably along an inner wall of the package, the dielectric body being accommodated in a configuration where a ball member is wedged in a region bounded on one side by the inner wall of the package.

21. A power generation device comprising:
a dielectric body;
an electret; and
a package for housing the dielectric body and the electret
wherein
a distance between the dielectric body and the electret is varied, whereby the power generation device generates power,
a first electrode is connected to the electret on a side not facing the dielectric body,
the first electrode is connected to a grounding terminal via a load,
a second electrode is connected to the dielectric body on a side not facing the electret,
the second electrode is directly connected to the grounding terminal,
the load is arranged to draw, in a form of a voltage, electrical current flowing between the first electrode and the grounding terminal due to vibration of the power generation device, and
the dielectric body is housed displaceably along an inner wall of the package, the dielectric body being accommodated in a configuration where a rail member is caused to abut the inner wall of the package.

22. A power generation device comprising:
a dielectric body; and
an electret;
wherein
a distance between the dielectric body and the electret is varied, whereby the power generation device generates power,
a first electrode is connected to the electret on a side not facing the dielectric body,
the first electrode is connected to a grounding terminal via a load,
a second electrode is connected to the dielectric body on a side not facing the electret,
the second electrode is directly connected to the grounding terminal,
the load is arranged to draw, in a form of a voltage, electrical current flowing between the first electrode and the grounding terminal due to vibration of the power generation device, and
the thickness of the dielectric body being 0.01 to 1.0 mm and the generating capacity thereof being 80% or above upon normalization performed using a generating capacity of 100% in a case where the relative permittivity of the dielectric body is infinite.

* * * * *